US011140634B2

(12) United States Patent
Ye et al.

(10) Patent No.: US 11,140,634 B2
(45) Date of Patent: Oct. 5, 2021

(54) NARROWBAND INTERNET-OF-THINGS (NB-IOT) ENHANCEMENTS

(71) Applicant: Apple Inc., Cupertino, CA (US)

(72) Inventors: Qiaoyang Ye, San Jose, CA (US); Debdeep Chatterjee, San Jose, CA (US); Salvatore Talarico, Sunnyvale, CA (US); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/473,586

(22) PCT Filed: Mar. 16, 2018

(86) PCT No.: PCT/US2018/022926
§ 371 (c)(1),
(2) Date: Jun. 25, 2019

(87) PCT Pub. No.: WO2018/175249
PCT Pub. Date: Sep. 27, 2018

(65) Prior Publication Data
US 2020/0314760 A1 Oct. 1, 2020

Related U.S. Application Data

(60) Provisional application No. 62/476,450, filed on Mar. 24, 2017, provisional application No. 62/475,484, filed on Mar. 23, 2017.

(51) Int. Cl.
*H04W 52/10* (2009.01)
*H04W 52/14* (2009.01)
(Continued)

(52) U.S. Cl.
CPC ......... *H04W 52/10* (2013.01); *H04W 52/146* (2013.01); *H04W 52/242* (2013.01);
(Continued)

(58) Field of Classification Search
CPC . H04W 52/10; H04W 52/146; H04W 52/242; H04W 52/50; H04W 72/1268; H04W 74/006; H04W 74/0833
(Continued)

(56) References Cited

U.S. PATENT DOCUMENTS 9,510,134 B2* 11/2016 Oh .................. H04L 5/0053
9,661,663 B1*  5/2017 Lin ................. H04L 27/2613
(Continued)

FOREIGN PATENT DOCUMENTS

WO   WO-2017014602 A1   1/2017
WO   WO-2018175249 A1   9/2018

OTHER PUBLICATIONS

"International Application Serial No. PCT/US2018/022926, International Search Report dated Jul. 10, 2018", 3 pgs.
(Continued)

*Primary Examiner* — Hai V Nguyen
(74) *Attorney, Agent, or Firm* — Kowert, Hood, Munyon, Rankin & Goetzel, P.C.

(57) ABSTRACT

An apparatus of a Narrowband Internet-of-Things (NB-IoT) user equipment (UE) includes processing circuitry. To configure the NB-IoT UE for open loop transmit power control, the processing circuitry is to decode a narrowband system information block (NB-SIB) to obtain a narrowband physical random access channel (NPRACH) resource set and power control information associated with the NPRACH resource set. A random access channel (RACH) preamble is encoded for transmission with or without repetitions to a base station during a RACH procedure and using the NPRACH resource set. The transmission has transmission power based on the power control information. A narrowband uplink resource assignment received during the RACH procedure is decoded. A connection setup completion mes-
(Continued)

sage is encoded for transmission to the base station using the narrowband uplink resource assignment.

28 Claims, 22 Drawing Sheets

(51) Int. Cl.
| | | |
|---|---|---|
| *H04W 52/24* | (2009.01) | |
| *H04W 52/50* | (2009.01) | |
| *H04W 72/12* | (2009.01) | |
| *H04W 74/00* | (2009.01) | |
| *H04W 74/08* | (2009.01) | |

(52) U.S. Cl.
CPC ....... *H04W 52/50* (2013.01); *H04W 72/1268* (2013.01); *H04W 74/006* (2013.01); *H04W 74/0833* (2013.01)

(58) Field of Classification Search
USPC .................................................. 455/522, 69
See application file for complete search history.

(56) References Cited

U.S. PATENT DOCUMENTS

| | | | | |
|---|---|---|---|---|
| 9,712,945 | B2* | 7/2017 | Oh | H04W 72/048 |
| 9,992,781 | B2* | 6/2018 | Chatterjee | H04W 36/0055 |
| 10,045,179 | B2* | 8/2018 | Oh | H04W 48/12 |
| 10,135,487 | B2* | 11/2018 | Horiuchi | H04W 48/12 |
| 10,136,447 | B2* | 11/2018 | Chatterjee | H04W 24/04 |
| 10,218,406 | B2* | 2/2019 | Liu | H04L 5/001 |
| 10,231,198 | B2* | 3/2019 | You | H04L 5/005 |
| 10,334,617 | B2* | 6/2019 | Rico Alvarino | H04W 72/1231 |
| 10,349,449 | B2* | 7/2019 | Hong | H04W 72/042 |
| 10,383,151 | B2* | 8/2019 | Chatterjee | H04W 74/0833 |
| 10,389,496 | B2* | 8/2019 | Hwang | H04W 72/0446 |
| 10,461,797 | B2* | 10/2019 | Liu | H04W 72/044 |
| 10,491,343 | B2* | 11/2019 | Rico Alvarino | H04L 5/0053 |
| 10,505,778 | B2* | 12/2019 | Kim | H04W 72/0406 |
| 10,506,502 | B2* | 12/2019 | Martinez Tarradell | H04W 74/008 |
| 10,555,345 | B2* | 2/2020 | Vajapeyam | H04W 4/70 |
| 10,601,627 | B2* | 3/2020 | Yi | H04J 11/0069 |
| 10,652,923 | B2* | 5/2020 | Wong | H04L 5/0053 |
| 10,673,671 | B2* | 6/2020 | Yi | H04W 36/24 |
| 10,681,684 | B2* | 6/2020 | Rico Alvarino | H04W 72/048 |
| 10,721,775 | B2* | 7/2020 | Park | H04W 74/0833 |
| 10,728,078 | B2* | 7/2020 | Kim | H04W 72/042 |
| 2013/0301524 | A1* | 11/2013 | Xu | H04W 28/06 370/328 |
| 2014/0313999 | A1* | 10/2014 | Xu | H04W 74/0833 370/329 |
| 2015/0043420 | A1* | 2/2015 | Xiong | H04W 56/00 370/315 |
| 2016/0135165 | A1* | 5/2016 | Takano | H04L 5/001 370/329 |
| 2016/0205671 | A1* | 7/2016 | Tabet | H04W 72/042 370/329 |
| 2016/0212737 | A1* | 7/2016 | Jang | H04L 5/001 |
| 2016/0227582 | A1* | 8/2016 | Vajapeyam | H04W 4/70 |
| 2016/0242211 | A1* | 8/2016 | Chung | H04J 11/0073 |
| 2016/0295345 | A1* | 10/2016 | Oh | H04W 48/12 |
| 2016/0301503 | A1* | 10/2016 | Rico Alvarino | H04W 76/28 |
| 2016/0374109 | A1* | 12/2016 | Rico Alvarino | H04H 20/16 |
| 2017/0078833 | A1* | 3/2017 | Oh | H04W 48/12 |
| 2017/0289965 | A1* | 10/2017 | You | H04L 27/00 |
| 2017/0318410 | A1* | 11/2017 | Oh | H04B 1/7143 |
| 2018/0020432 | A1* | 1/2018 | Rico Alvarino | H04W 72/0453 |
| 2018/0062699 | A1* | 3/2018 | Horiuchi | H04L 5/0053 |
| 2018/0069589 | A1* | 3/2018 | Liu | H04B 7/2634 |
| 2018/0103465 | A1* | 4/2018 | Agiwal | H04W 72/0413 |
| 2018/0124836 | A1* | 5/2018 | Hong | H04W 74/008 |
| 2018/0145802 | A1* | 5/2018 | Hwang | H04L 5/0005 |
| 2018/0206271 | A1* | 7/2018 | Chatterjee | H04L 5/0053 |
| 2018/0213468 | A1* | 7/2018 | Chatterjee | H04W 48/10 |
| 2018/0227866 | A1* | 8/2018 | Jung | H04L 5/0053 |
| 2018/0235003 | A1* | 8/2018 | Wong | H04L 1/1864 |
| 2018/0262975 | A1* | 9/2018 | Martinez Tarradell | H04W 16/10 |
| 2018/0270008 | A1* | 9/2018 | Yi | H04W 72/1289 |
| 2018/0270855 | A1* | 9/2018 | Loehr | H04L 1/189 |
| 2018/0270866 | A1* | 9/2018 | Loehr | H04W 74/0833 |
| 2018/0270895 | A1* | 9/2018 | Park | H04W 24/04 |
| 2018/0279358 | A1* | 9/2018 | Babaei | H04W 72/0453 |
| 2018/0287845 | A1* | 10/2018 | Kim | H04L 27/2666 |
| 2018/0287846 | A1* | 10/2018 | Kim | H04W 74/0808 |
| 2018/0332566 | A1* | 11/2018 | You | H04W 72/042 |
| 2019/0036756 | A1* | 1/2019 | Yi | H04L 67/12 |
| 2019/0037637 | A1* | 1/2019 | Suzuki | H04W 72/042 |
| 2019/0045553 | A1* | 2/2019 | Zhang | H04L 5/0048 |
| 2019/0075602 | A1* | 3/2019 | Lin | H04L 5/0012 |
| 2019/0089498 | A1* | 3/2019 | Pelletier | H04W 72/042 |
| 2019/0124699 | A1* | 4/2019 | Yamada | H04W 74/0866 |
| 2019/0149185 | A1* | 5/2019 | Liu | H04B 1/406 375/130 |
| 2019/0239051 | A1* | 8/2019 | Hwang | H04W 56/001 |
| 2019/0239170 | A1* | 8/2019 | Thangarasa | H04W 52/365 |
| 2019/0319764 | A1* | 10/2019 | Nader | H04W 72/0453 |
| 2019/0320430 | A1* | 10/2019 | Kim | H04W 74/0833 |
| 2019/0320467 | A1* | 10/2019 | Freda | H04W 74/0833 |
| 2019/0327039 | A1* | 10/2019 | Hwang | H04L 5/0005 |
| 2019/0364408 | A1* | 11/2019 | Park | H04L 5/0053 |
| 2019/0386807 | A1* | 12/2019 | Kazmi | H04L 5/0078 |
| 2019/0387383 | A1* | 12/2019 | Ye | H04W 8/24 |
| 2019/0387409 | A1* | 12/2019 | Thangarasa | H04W 16/00 |
| 2020/0015266 | A1* | 1/2020 | Yan | H04W 74/0833 |
| 2020/0015285 | A1* | 1/2020 | Shin | H04W 52/146 |
| 2020/0067690 | A1* | 2/2020 | Park | H04L 5/0048 |
| 2020/0076667 | A1* | 3/2020 | Kim | H04W 74/0841 |
| 2020/0107247 | A1* | 4/2020 | Ioffe | H04W 76/10 |
| 2020/0112997 | A1* | 4/2020 | Vajapeyam | H04W 74/0833 |
| 2020/0187256 | A1* | 6/2020 | Lim | H04W 72/042 |

OTHER PUBLICATIONS

"International Application Serial No. PCT/US2018/022926, Written Opinion dated Jul. 10, 2018", 5 pgs.
Sharp, "Remaining issues on transmit power control for NB-IoT", R1-162837, 3GPP TSG RAN WG1 Meeting #84bis, Busan, Korea, (Apr. 6, 2016).
ZTE, "Remaining issues on UL power control for NB-IoT", R1-162765, 3GPP TSG RAN WG1 Meeting #84bis, Busan, Korea, (Apr. 5, 2016).
Ericsson, "Further Reduced Power Class in NB-IoT", 3GPP Draft, R2-168324, vol. RAN WG2, Nov. 13, 2016, Reno, USA, 11 pgs.
Keysight Technologies, "Discussion on NB-IoT Minimum Output Power", 3GPP Draft, R5-170136, vol. RAN WG5, Jan. 9, 2017, Kochi, India, 3 pgs.
Ericsson, "On the Performance of MIB-NB and SIB1-NB Acquisition"; 3GPP Draft, R1-1701895, vol. RAN WG1, Feb. 12, 2017, Athens, Greece, 6 pgs.
Nokia Networks et al., "NB-PBCH Design for NB-IoT", 3GPP Draft, R1-160441, vol. RAN WG1, Feb. 14, 2016, St. Julian's, Malta, 3 pgs.
"14 UE Procedures Related to Sidelink", 3 Generation Partnership Project; Technical Specification Group Radio Access Network; Evolved Universal Terrestrial Radio Access (E-UTRA); Physical Layer Procedures (Release 14), 3 GPP TS 36.213; vol. RAN WG1, No. V14.1.0, Jan. 2, 2017, pp. 352-402.
3rd Generation Partnership Project; Technical Specification Group Radio Access Network; Evolved Universal Terrestrial Radio Access (E-UTRA); Medium Access Control (MAC) Protocol Specification (Release 14), 3 GPP TS 36.321; vol. RAN WG2, No. V14.2.0, Mar. 22, 2017, pp. 1-106.
European Search Report for Application No. EP18771864.8, dated Dec. 7, 2020, 11 pgs.

* cited by examiner

NARROWBAND INTERNET-OF-THINGS (NB-IOT) ENHANCEMENTS

PRIORITY CLAIM

This application is a U.S. National Stage Filing under 35 U.S.C. 371 from International Application No. PCT/US2018/022926, filed Mar. 16, 2018, which claims the benefit of priority to the following applications:

U.S. Provisional Patent Application Ser. No. 62/475,484, filed Mar. 23, 2017, and entitled "ENHANCEMENTS TO NARROW BAND INTERNET OF THINGS FOR EFFICIENT SMALL CELL DEPLOYMENTS"; and U.S. Provisional Patent Application Ser. No. 62/476,450, filed Mar. 24, 2017, and entitled "OPTIMIZATION OF CONTROL REGION FOR STANDALONE AND GUARD-BAND NARROWBAND INTERNET OF THINGS (NB-IOT)"

The above-identified applications are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to MulteFire networks. Additional aspects are directed to Narrowband Internet-of-Things (NB-IoT) enhancements for wireless networks, such as wireless networks based on small cell deployments. Further aspects are related to optimizations of a control region for standalone and guard-band NB-IoT devices.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

The use of networked UEs using 3GPP LTE systems has increased in areas of home and work life. Fifth generation (5G) wireless systems are forthcoming, and are expected to enable even greater speed, connectivity, and usability. Next generation 5G networks are expected to increase throughput, coverage, and robustness and reduce latency and operational and capital expenditures. AS current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments. Further enhanced operation of LTE systems in the licensed as well as unlicensed spectrum is expected in future releases and 5G systems.

Machine-Type Communications (MTC), such as Machine-to-Machine (M2M) communications, as well as IoT communications, represent a significant growth opportunity for 3GPP ecosystems. With proliferation of the wireless networks, there is an accelerated push towards connected, smart physical objects, such as wireless sensors, smart meters, dedicated microprocessors, etc., that span different ecosystems with diverse business models. In this regard, various data delivery mechanisms can be deployed within a dense communication environment, including small cell based communication networks.

Due to the interest in integrating connectivity solutions with sensors, actuators, meters (e.g., water, gas, electric, or parking), cars, appliances, etc., and due to the increasing use cases that can be developed through MTC, Internet-of-Things (IoT) is persistently continuing to grow momentum. IoT consists of a number of networks that may have different design objectives. For example, some networks can be used to cover a local area (e.g., one single home), whereas other IoT networks can offer wide-area coverage. Furthermore, the development scenario might vary from one network to another.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1A:
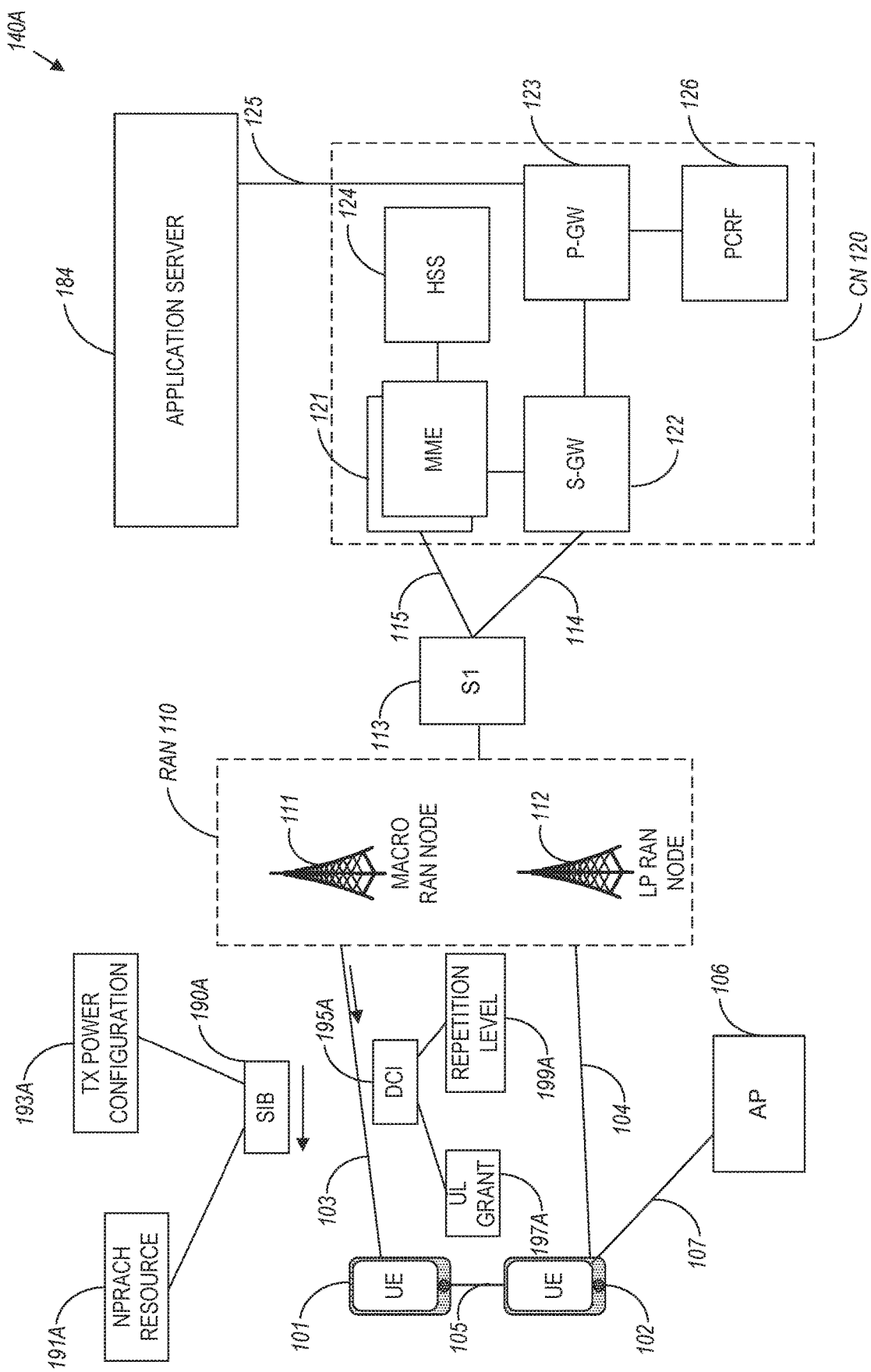
FIG. 1A illustrates an architecture of a network in accordance with some aspects.

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit -Switched Data (HSCSD), Universal Mobile Telecommunications System (Third Generation) (UMTS (3G)). Wideband Code Division Multiple Access (Universal Mobile Telecommunications System) (W-CDMA (UMTS)), High Speed Packet Access (HSPA), High-Speed Downlink Packet Access (HSDPA). High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division -Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), edmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telfoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telphony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11 ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few). IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 3 (61.56-63.72 GHz), and WiGig Band 4 (63.72-65.88 GHz), the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1A illustrates an architecture of a network in accordance with some aspects. The network 140A is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN). Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below): in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, RAN 110 can include NG RAN or NG Core RAN. The RAN 110 can include various functions, such as, for example, an access and mobility management function (AMF), a session management function (SMF), a user plane function (UPF), a policy control function (PCF), a unified data management (UDM) function, and a network function (NF) repository function (NRF). The AMF can be used to manage access control and mobility, and can also include network slice selection functionality. The SMF can be configured to set up and manage various sessions according to a network policy. The UPF can be deployed in one or more configurations according to a desired service type. The PCF can be configured to provide a policy framework using network slicing, mobility management, and roaming (similar to PCRF in a 4G communication system). The UDM can be configured to store subscriber profiles and data (similar to an HSS in a 4G communication system). Various aspects of NG RAN and NG Core are discussed herein in reference to, e.g., FIG. 1B, FIG. 1C, FIG. 1D, FIG. 1E, FIG. 1F, and FIG. 1G.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. each column and each row of the resource rid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe mapping of certain physical channels to resource elements.

Each resource block may comprise a collection of resource elements: in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be send on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4 or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1E). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate a SGi interface toward a PDN. The P-GW 123 may route data packets between the EPC network 120 and external networks such as a network including the application server 184 (alternatively referred to as application function (AF)) via an Internet Protocol (IP) interface 125. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension. UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum), (b) in-band deployment (the network operates within the LTE channel), and the (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments. Techniques disclosed herein can be used in connection with FeNB-IoT communications and, more specifically, mitigating the inter-cell interference effect for NPRACH and NPUSCH in small cell environments as well as improving downlink coverage when transmission power of a small cell base station is smaller than base station transmission power in a microcell.

In some aspects and in reference to FIG. 1A, a base station such as eNB 111 can communicate system information (e.g., a system information block or SIB 190A) to UE 101. The SIB 190A can include an NPRACH resource 191A as well as transmit (TX) power configuration information 193A. In some aspects, the TX power configuration information 193A can include transmit power allocated to a physical resource block (PRB), a path loss compensation factor, and/or other parameters which can be used by the UE to determine TX power according to one or more transmit power equations when data and control information (e.g., NPRACH and NPUSCH) are transmitted with repetitions.

In some aspects, eNB 111 can also transmit downlink control information (DCI) 195A. The DCI 195A can include an uplink grant 197A as well as repetition level 199A. The repetition level 199A can indicate a number of repetitions for use by the UE 101 when transmitting data or commands using the uplink grant information 197A. Additional techniques related to NB-IoT enhancements are discussed herein below in reference to FIG. 7 to FIG. 13.

Figure 1B:
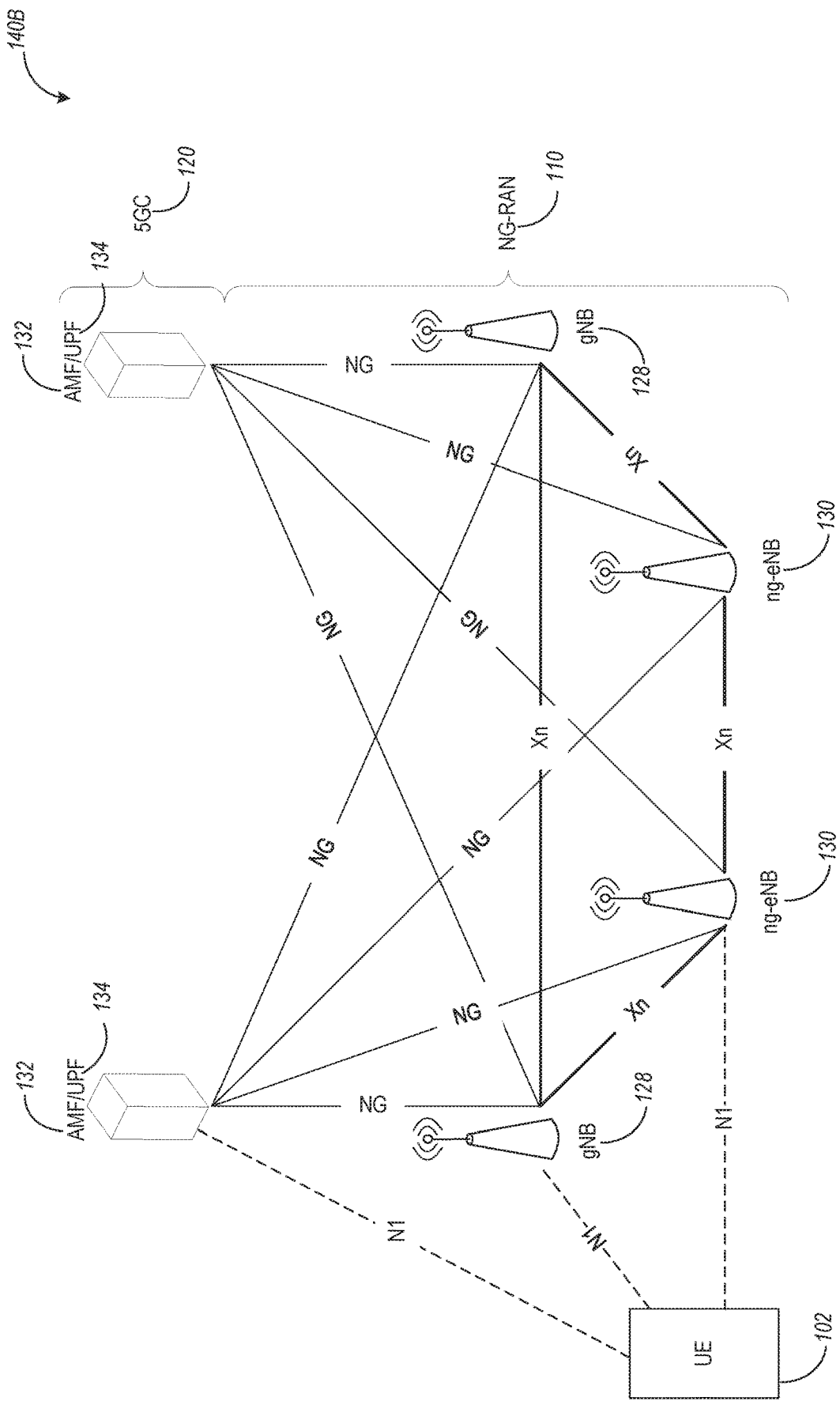
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via, e.g., an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE, and is connected via the NG interface to the 5GC 120. In some aspects, an NG-eNB 130 can include a node providing evolved universal terrestrial radio access (E-UTRA) user plane and control plane protocol terminations towards the UE, and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
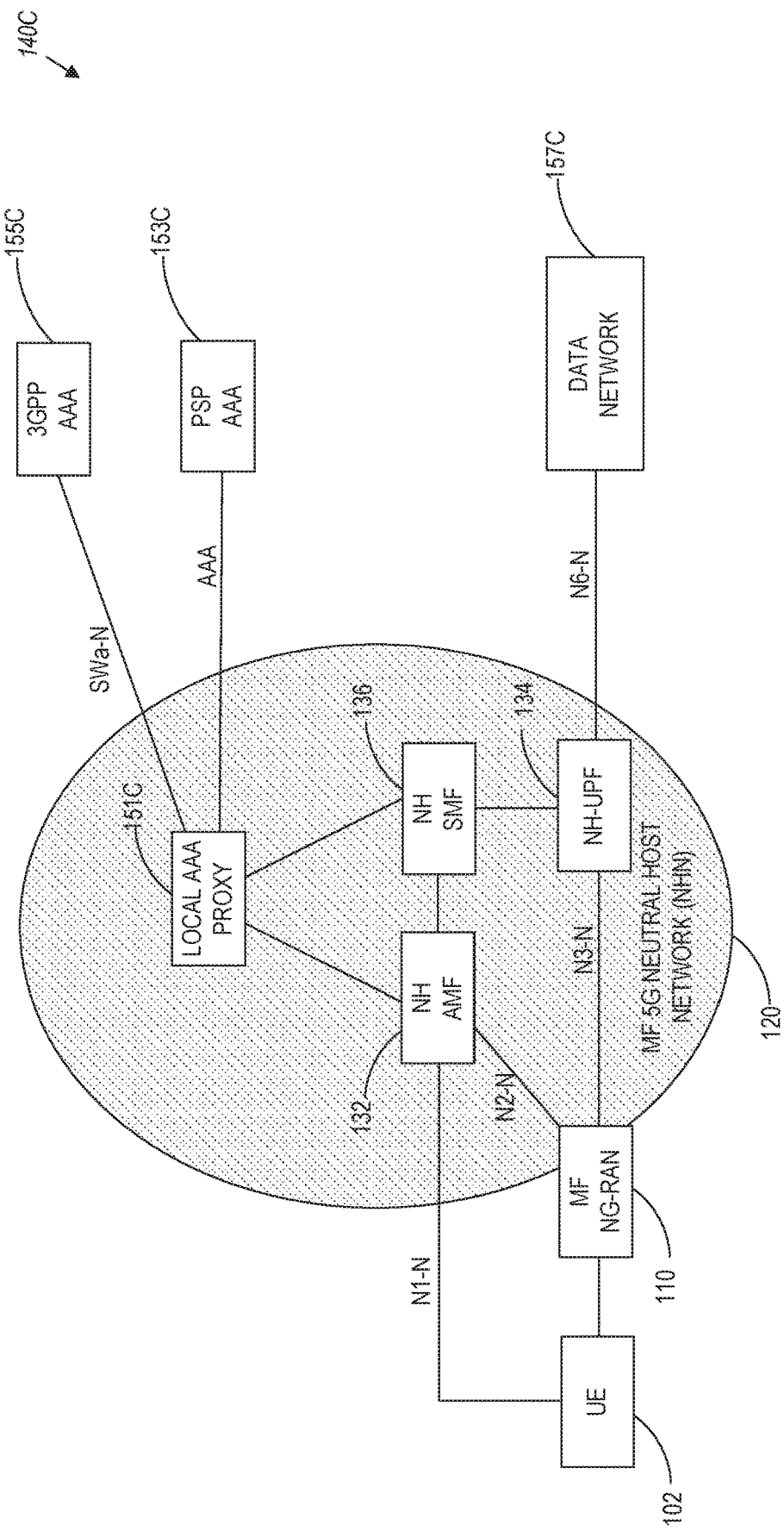
FIG. 1C illustrates an example MulteFire Neutral Host Network (NHN) 5G architecture in accordance with some aspects.

FIG. 1C illustrates an example MulteFire Neutral Host Network (NHN) 5G architecture 140C in accordance with some aspects. Referring to FIG. 1C, the MulteFire 5G architecture 140C can include the UE 102, NG-RAN 110, and core network 120. The NG-RAN 110 can be a MulteFire NG-RAN (MF NG-RAN), and the core network 120 can be a MulteFire 5G neutral host network (NHN).

In some aspects, the MF NHN 120 can include a neutral host AMF (NH AMF) 132, a NH SMF 136, a NH UPF 134, and a local AAA proxy 151C. The AAA proxy 151C can provide connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as a AMF in a 3GPP 5G core network (e.g., as described in reference to FIG. 1D). The NH-SMF 136 can be configured to provide similar functionality as a SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
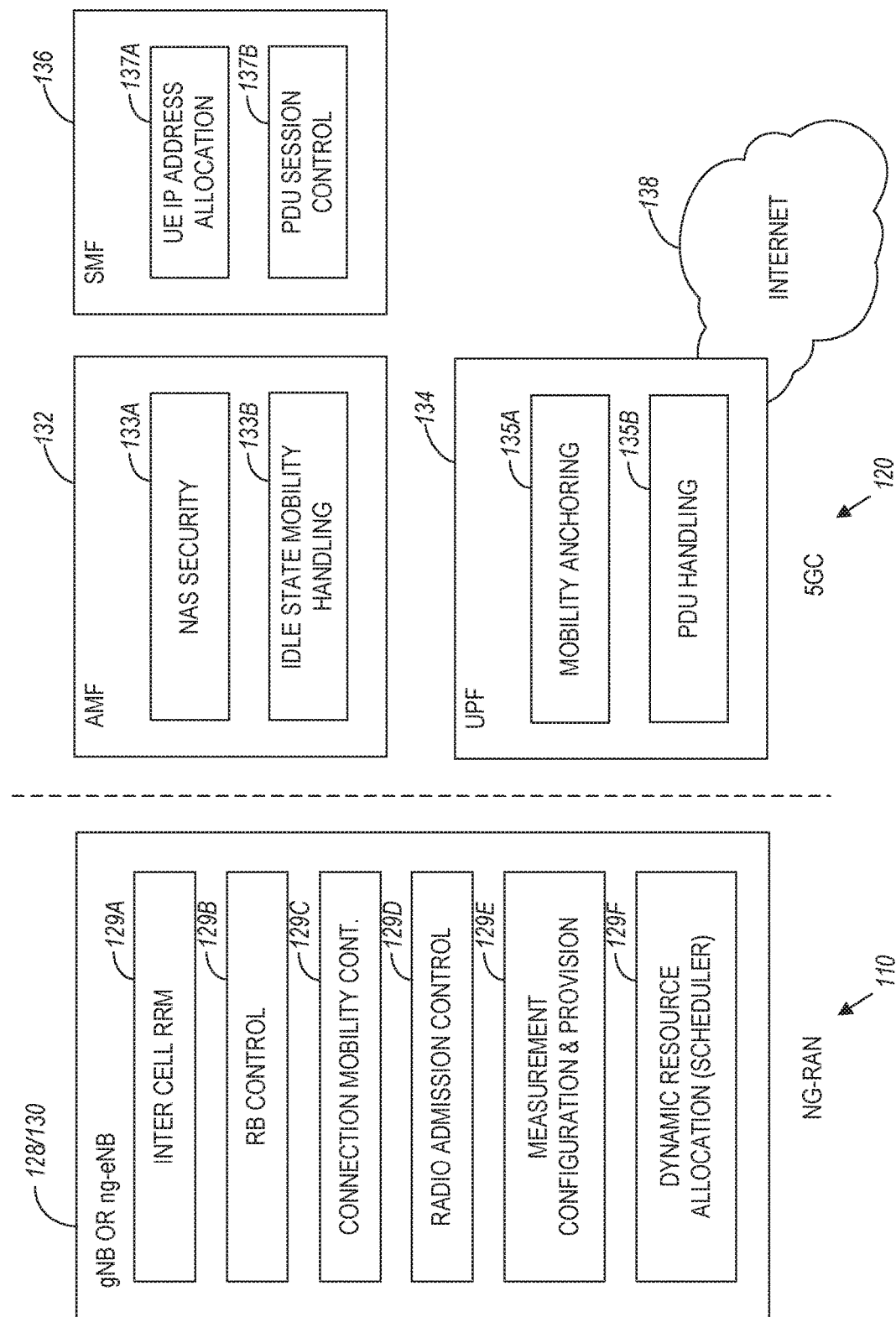
FIG. 1D illustrates a functional split between next generation radio access network (NG-RAN) and the 5G Core network (5GC) in accordance with some aspects.

FIG. 1D illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, connection mobility control 129C, dynamic allocation of resources to UEs in both uplink and downlink (scheduling) 129F); IP header compression, encryption and integrity protection of data; selection of an AMF at UE attachment when no routing to an AMF can be determined from the information provided by the UE, routing of User Plane data towards UPF(s); routing of Control Plane information towards AMF; connection setup and release; scheduling and transmission of paging messages (originated from the AMF), scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers, support of UEs in RRC_INACTIVE state; distribution function for non-access stratus (NAS) messages; radio access network sharing; dual connectivity; and tight interworking between NR and E-UTRA, to name a few.

In some aspects, the AMF 132 can be configured to host the following functions, for example. NAS signaling termination; NAS signaling security 133A; access stratus (AS) security control; inter core network (CN) node signaling for mobility between 3GPP access networks; idle state mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of UP function; PDU session control 137B, including configuring traffic steering at UPF 134 to route traffic to proper destination: control part of policy enforcement and QoS; and/or downlink data notification, among other functions.

Figure 1E:
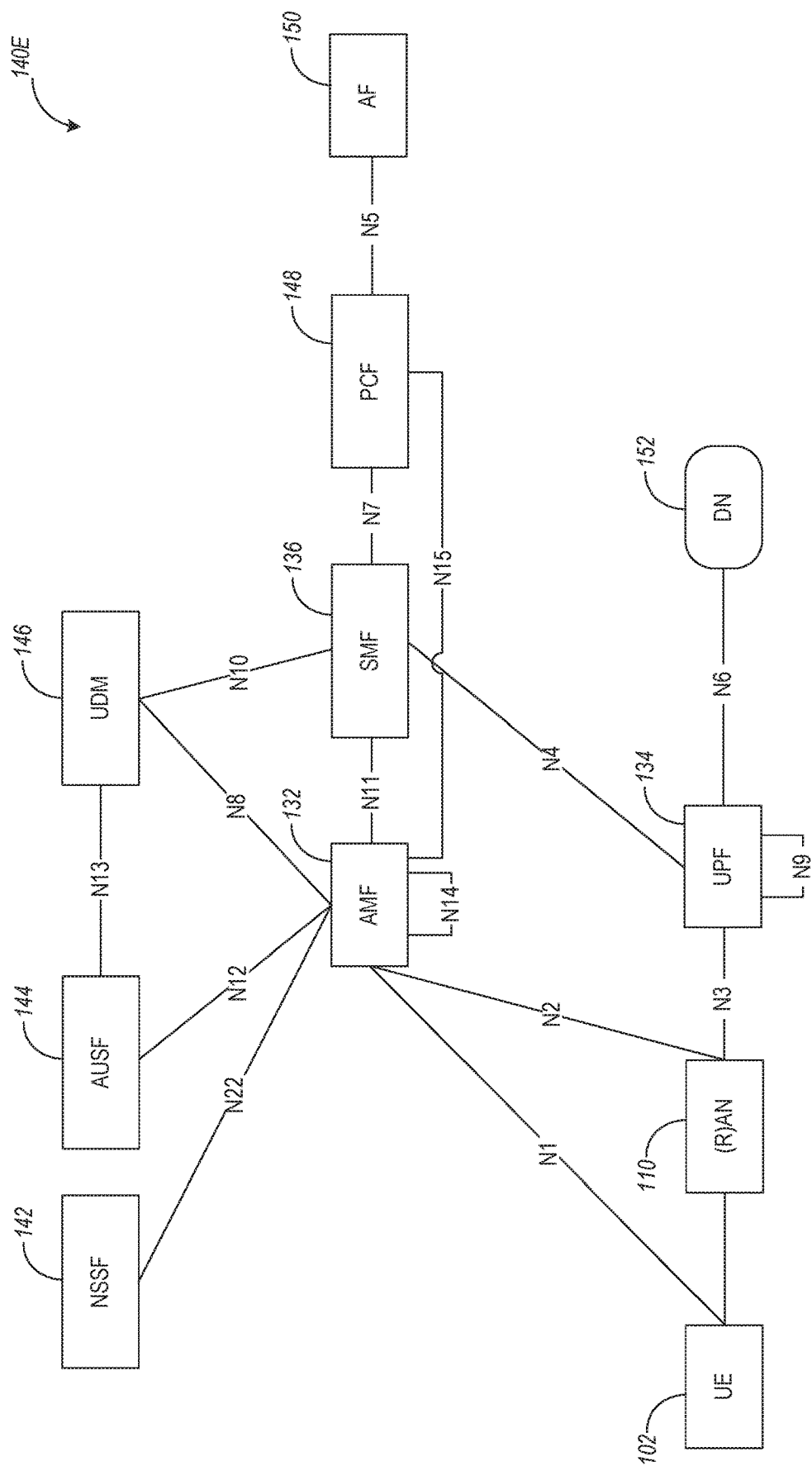
FIG. 1E and FIG. 1F illustrate a non-roaming 5G system architecture in accordance with some aspects.
Figure 1F:
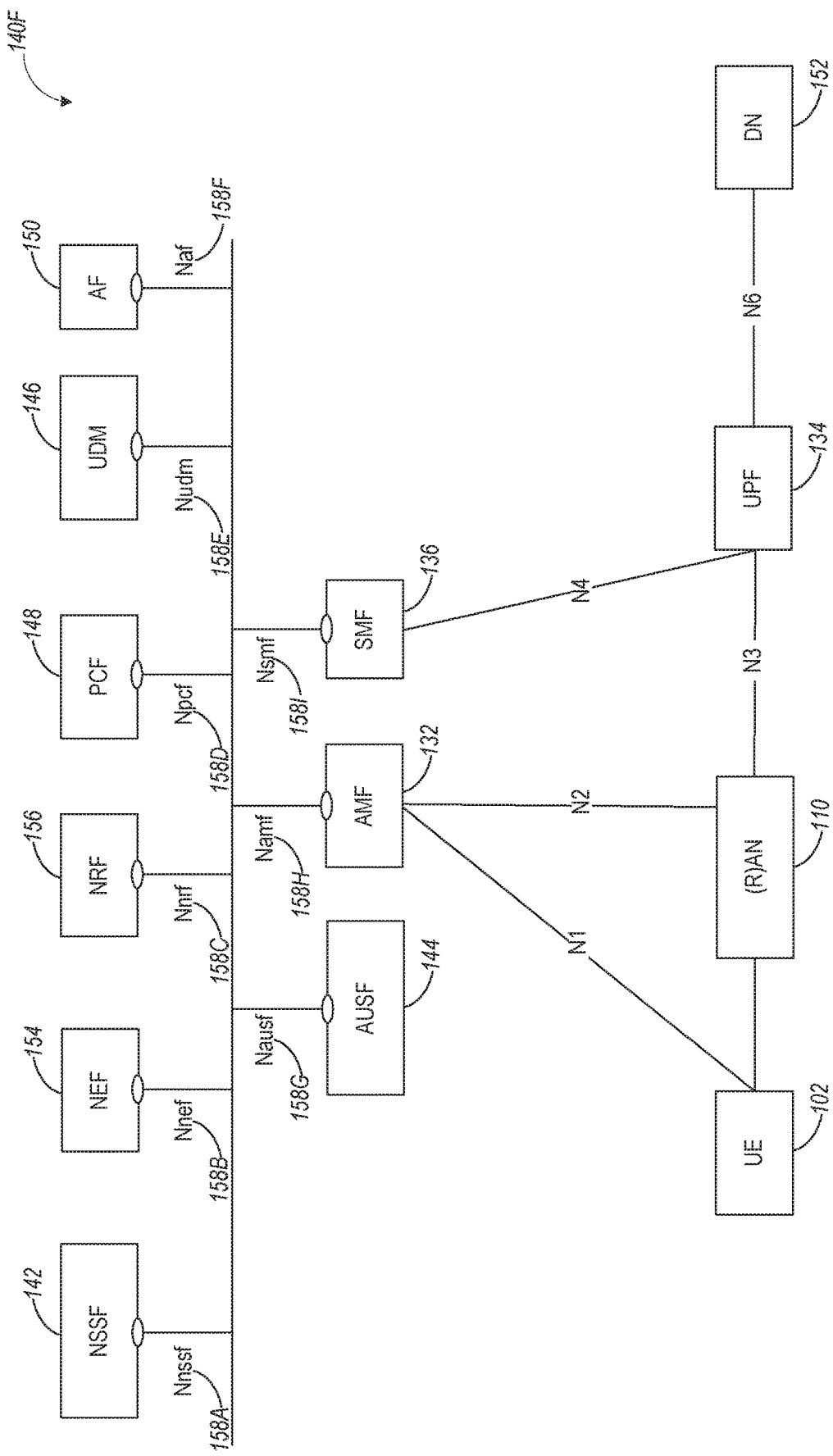

FIG. 1E and FIG. 1F illustrate a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5GC network entities. The 5GC system architecture 140D includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM) 146. The UPF 134 can provide a connection to a data network (DN) 152, which can include, for example, operator services, Internet access, or third-party services.

Referring to FIG. 1F, there is illustrated a 5G system architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1E) or as service-based interfaces (as illustrated in FIG. 1F).

A reference point representation shows that an interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1D), and N22 (between AMF 132 and NSSF 142). Other reference point representations not shown in FIG. 1E can also be used.

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132). Nsmf 158I (a service-based interface exhibited by the SMF 136). Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
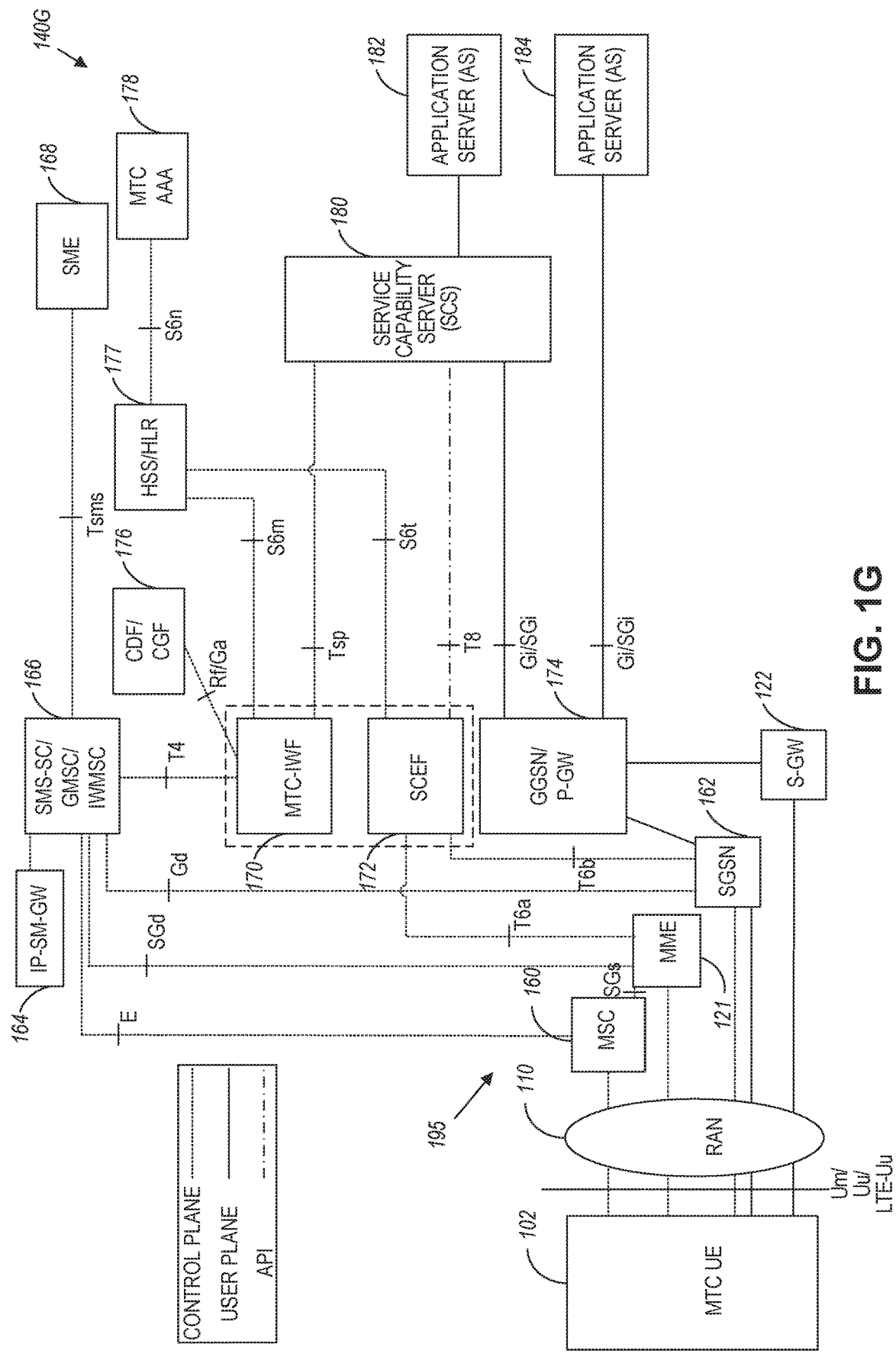
FIG. 1G illustrates an example Cellular Internet-of-Things (CIoT) network architecture in accordance with some aspects.

FIG. 1G illustrates an example CIoT network architecture in accordance with some aspects. Referring to FIG. 1G, the CIoT architecture 140G can include the UE 102 and the RAN 110 coupled to a plurality of core network entities. In some aspects, the UE 102 can be machine-type communication (MTC) UE. The CIoT network architecture 140G can further include a mobile services switching center (MSC) 160, MME 121, a serving GPRS support note (SGSN) 162, a S-GW 122, an IP-Short-Message-Gateway (IP-SM-GW) 164, a Short Message Service Service Center (SMS-SC)/gateway mobile service center (GMSC)/Interworking MSC (IWMSC) 166. MTC interworking function (MTC-IWF) 170, a Service Capability Exposure Function (SCEF) 172, a gateway GPRS support node (GGSN)/Patent-GW 174, a charging data function (CDF)/charging gateway function (CGF) 176, a home subscriber server (HSS)/a home location register (HLR) 177, short message entities (SME) 168, MTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1G further illustrates various reference points between different servers, functions, or communication nodes of the CIoT network architecture 140G. Some example reference points related to MTC-IWF 170 and SCEF 172 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by MTC-IWF 170 to interrogate HSS/HLR 177), S6n (a reference point used by MTC-AAA server 178 to interrogate HSS/HLR 177), and S6t (a reference point used between SCEF 172 and HSS/HLR 177).

In some aspects, the CIoT UE 102 can be configured to communicate with one or more entities within the CIoT architecture 140G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture.

In some aspects, the NAS protocol can support a set of NAS messages for communication between the CIoT UE 102 and an Evolved Packet System (EPS) Mobile Management Entity (MME) 121 and SGSN 162.

In some aspects, the CIoT network architecture 140F can include a packet data network, an operator network, or a cloud service network, having, for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including, for example, an air interface based on an S6a reference point, and configured to authenticate/authorize CIoT UE 102 to access the CIoT network. The RAN 110 can be coupled to the CIoT network architecture 140G using one or more other reference points including, for example, an air interface corresponding to an SGi/Gi interface for 3GPP accesses. The RAN 110 can be coupled to the SCEF 172 using, for example, an air interface based on a T6a/T6b reference point, for service capability exposure. In some aspects, the SCEF 172 may act as an API GW towards a third-party application server such as AS 182. The SCEF 172 can be coupled to the HSS/HLR 177 and MTC AAA 178 servers using an S6t reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIoT UE 102 can include a smart phone, a tablet computer, or one or more other electronic device acting as a CIoT device for a specific function, while having other additional functionality.

In some aspects, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. In some aspects, circuitry as well as modules disclosed herein may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 1H:
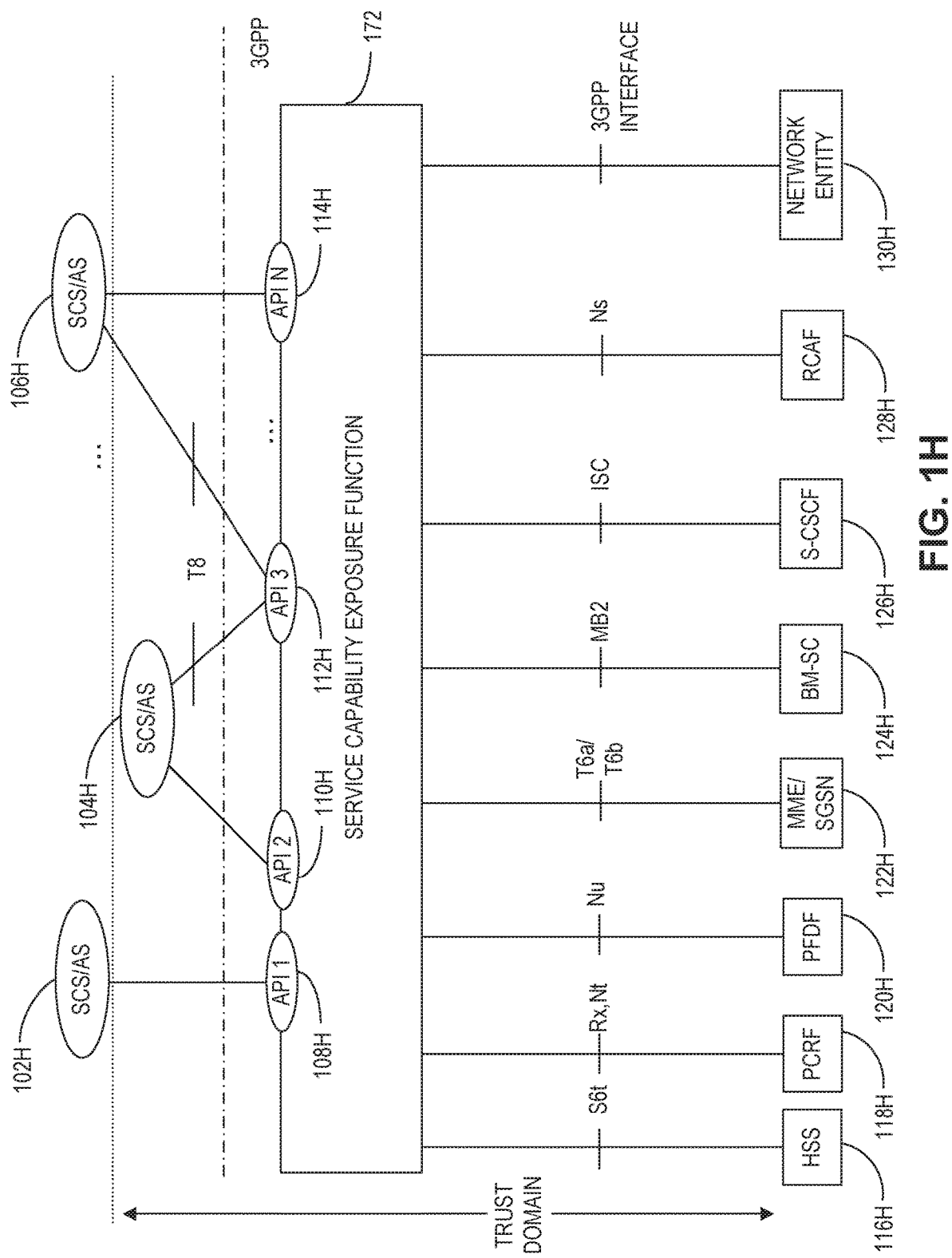
FIG. 1H illustrates an example Service Capability Exposure Function (SCEF) in accordance with some aspects.

FIG. 1H illustrates an example Service Capability Exposure Function (SCEF) in accordance with some aspects. Referring to FIG. 1H, the SCEF 172 can be configured to expose services and capabilities provided by 3GPP network interfaces to external third party service provider servers hosting various applications. In some aspects, a 3GPP network such as the CIoT architecture 140G, can expose the following services and capabilities: a home subscriber server (HSS) 116H, a policy and charging rules function (PCRF) 118H, a packet flow description function (PFDF) 120H, a MME/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H.

The SCEF 172 can be configured to expose the 3GPP network services and capabilities to one or more applications running on one or more service capability server (SCS)/application server (AS), such as SCS/AS 102H, 104H, . . . , 106H. Each of the SCS/AG 102H-106H can communicate with the SCEF 172 via application programming interfaces (APIs) 108H, 110H, 112H, . . . , 114H, as seen in FIG. 1H.

Figure 1I:
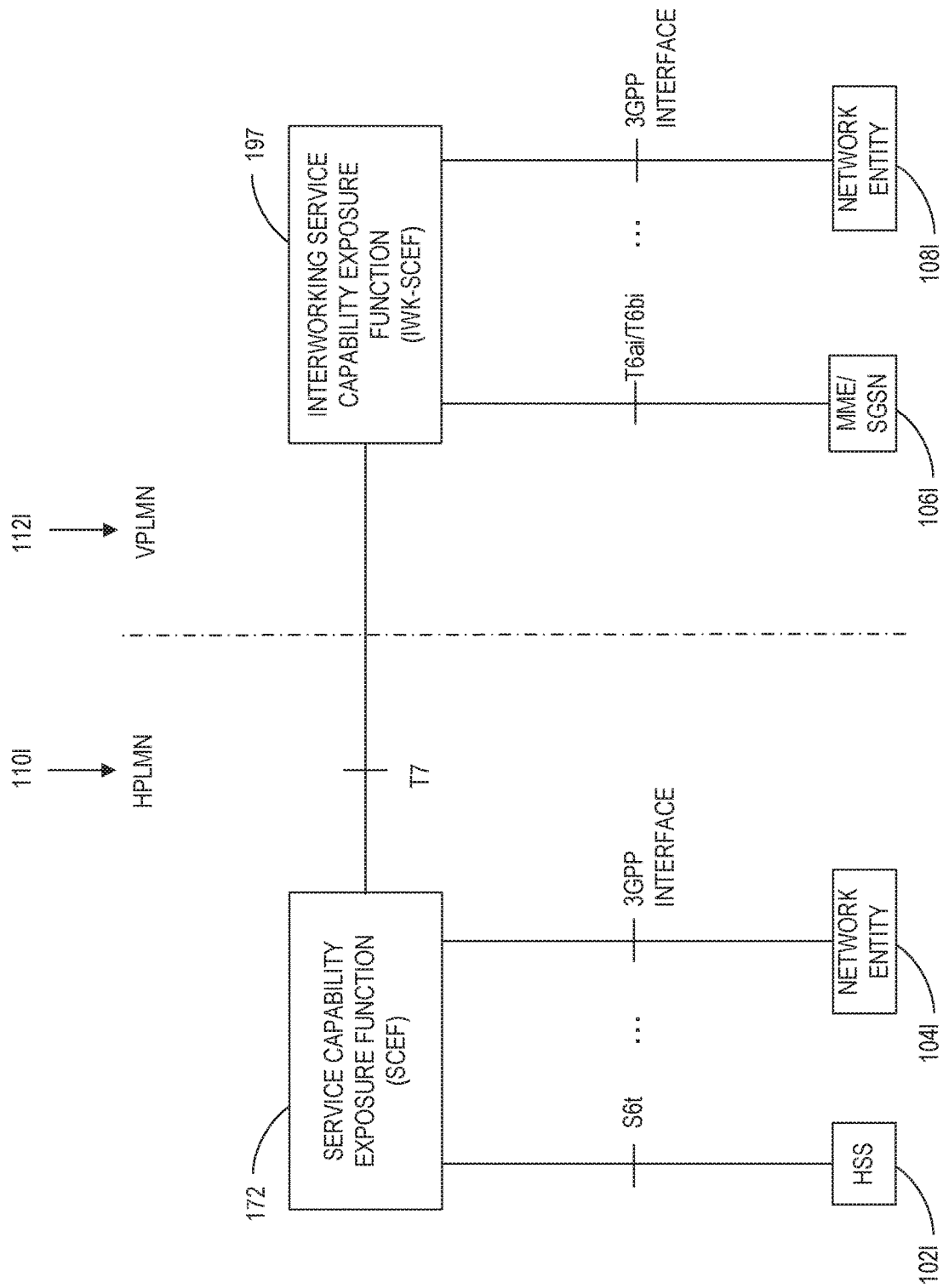
FIG. 1I illustrates an example roaming architecture for SCEF in accordance with some aspects.

FIG. 1I illustrates an example roaming architecture for SCEF in accordance with some aspects. Referring to FIG. 1I, the SCEF 172 can be located in HPLMN 110I and can be configured to expose 3GPP network services and capabilities, such as 102I, . . . , 104I. In some aspects, 3GPP network services and capabilities, such as 106I, . . . , 108I, can be located within VPLMN 112I. In this case, the 3GPP network services and capabilities within the VPLMN 112I can be exposed to the SCEF 172 via an interworking SCEF (IWK-SCEF) 197 within the VPLMN 112I.

Figure 2:
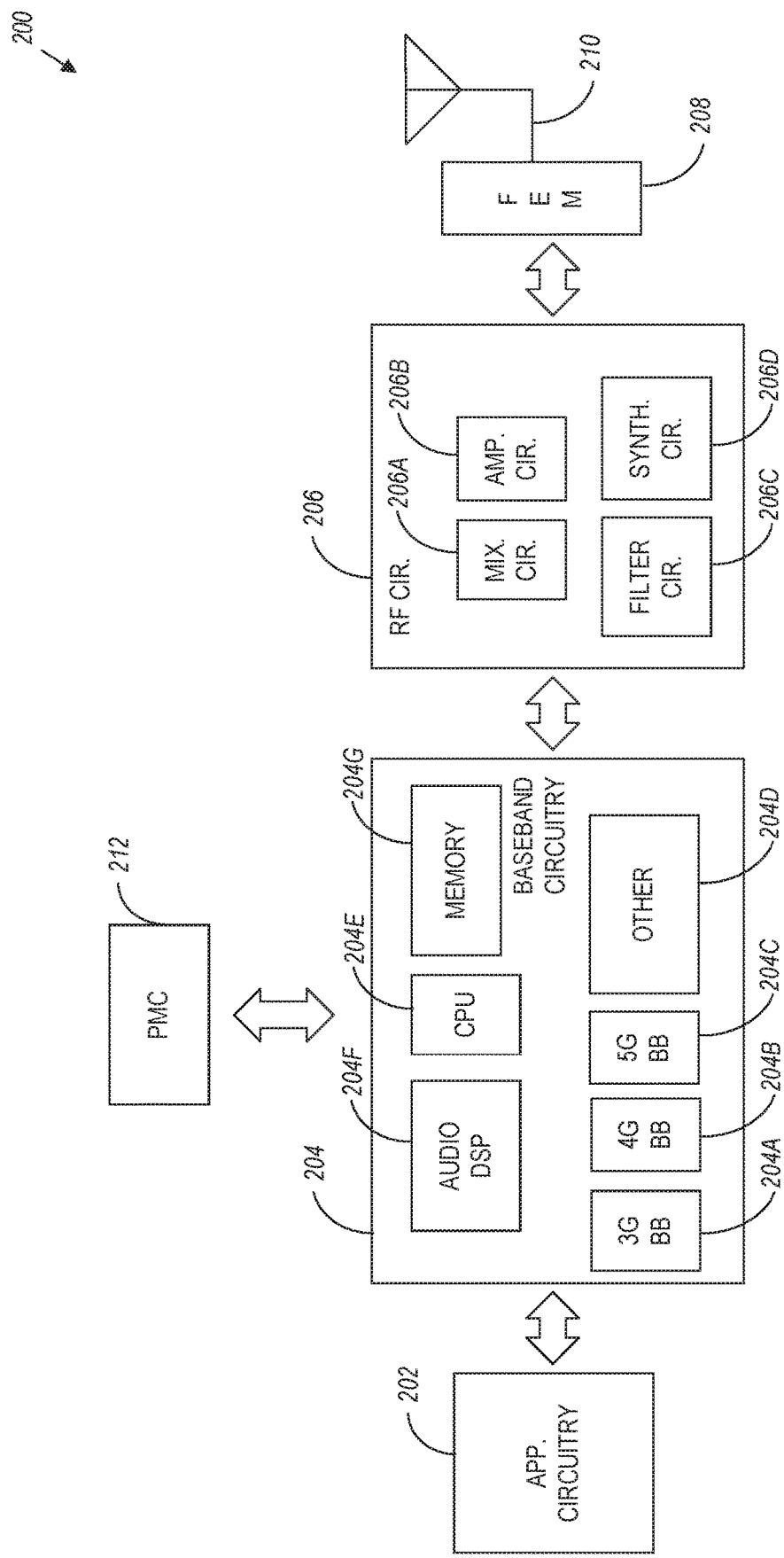
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some aspects, modulation/demodulation circuitry of the baseband circuitry 204 may include Fast-Fourier Transform (FFT), precoding, or constellation mapping/de-mapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry 204 may be suitably combined in a single chip, a single chipset, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local are network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature down conversion and up conversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct down conversion and direct up conversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N-synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. Divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling, battery charging, and/or DC-to-DC conversion. The PMC 212 may, in some aspects, be included when the device 200 is capable of being powered by a battery, for example, when the device is included in a UE. The PMC 212 may increase the power conversion efficiency while providing beneficial implementation size and heat dissipation characteristics.

FIG 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
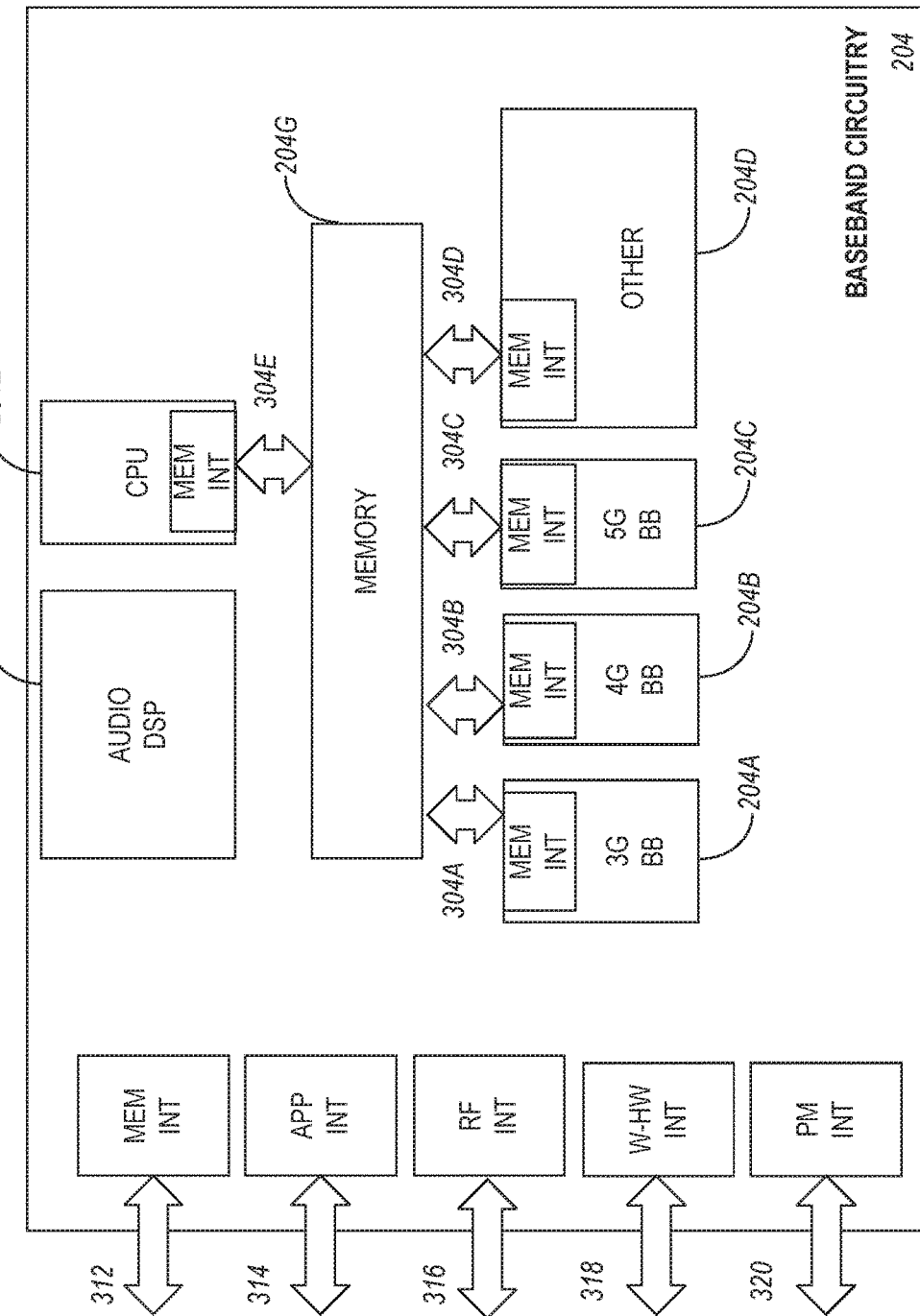
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 101 (or alternatively, the UE 102), the RAN node 111 (or alternatively, the RAN node 112), and the MME 121.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may in some aspects operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also in some aspects execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In some aspects, primary services and functions of the RRC layer 405 may include broadcast of system information (e.g., included in Master Information Blocks (MIBs) or System Information Blocks (SIBs) related to the non-access stratum (NAS)); broadcast of system information related to the access stratum (AS); paging, establishment, maintenance, and release of an RRC connection between the UE and E-UTRAN (e.g., RRC connection paging, RRC connection establishment, RRC connection modification, and RRC connection release); establishment, configuration, maintenance, and release of point-to-point Radio Bearers, security functions including key management, inter-radio access technology (RAT) mobility; and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121 as illustrated in FIG. 4. In aspects, the NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. In certain aspects, the S1-AP layer 415 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (which may alternatively be referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node 111 and the MME 121 to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
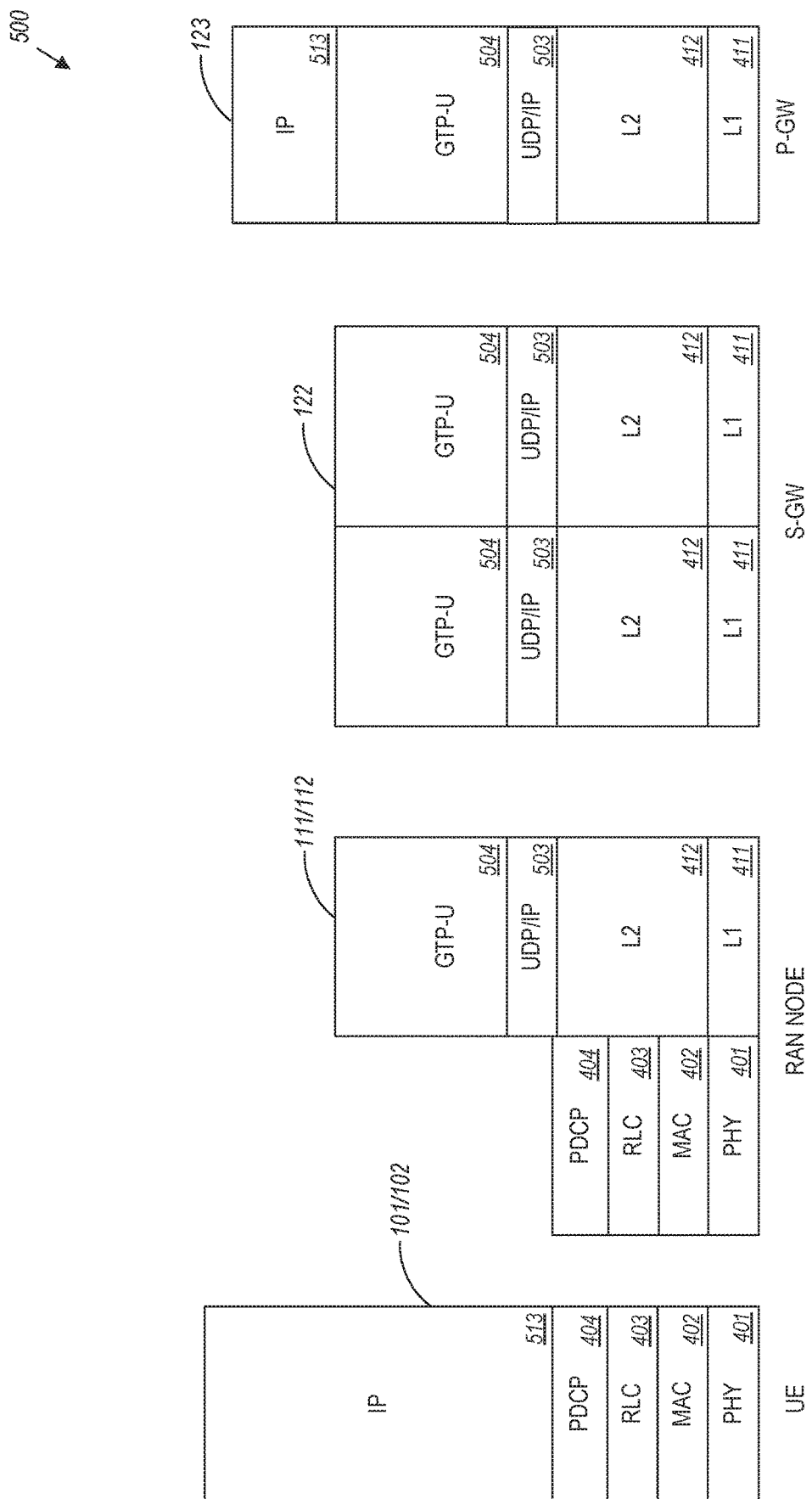
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, and the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in IPv4, IPv6, or PPP formats, for example. The UPD and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
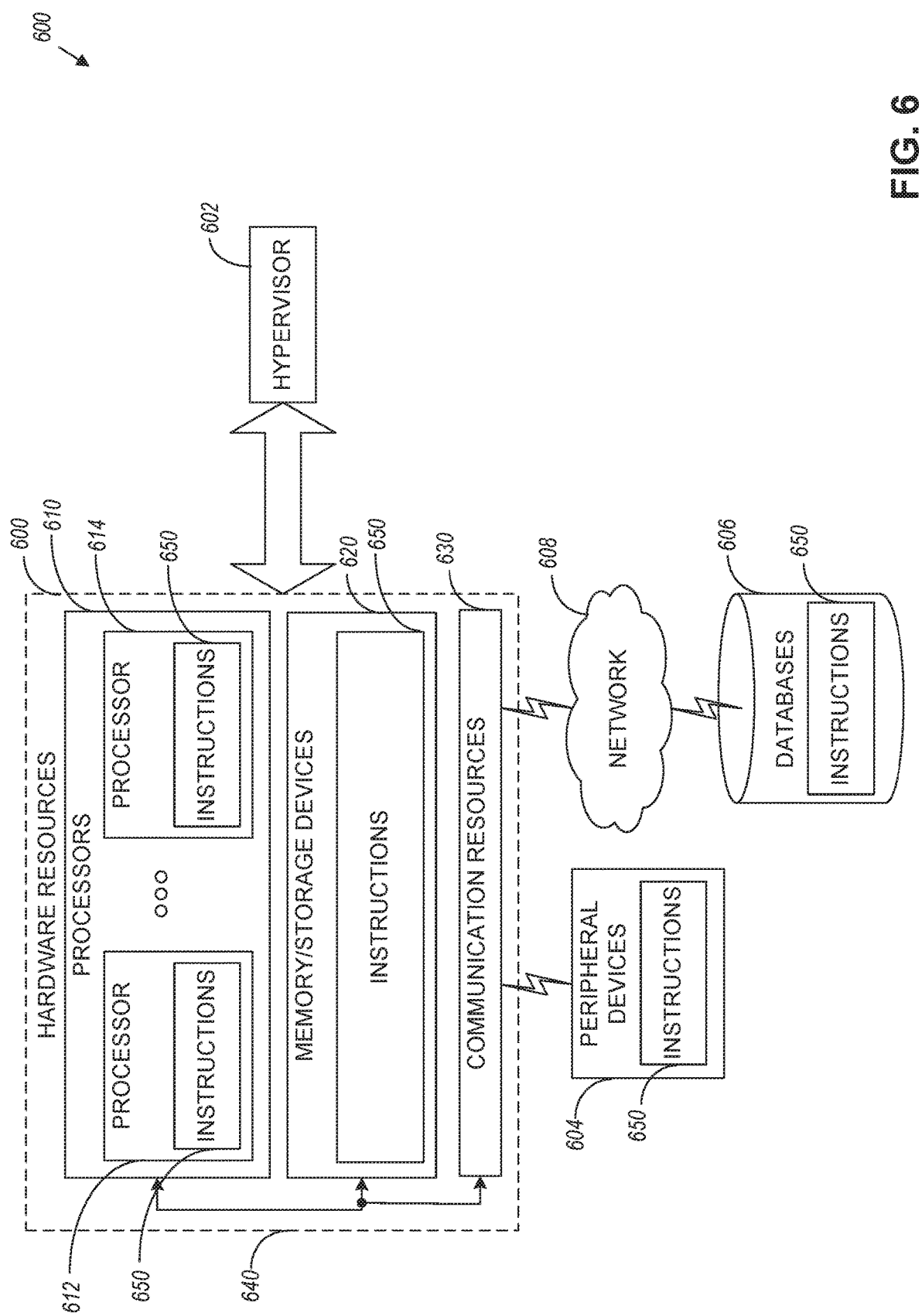
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize the hardware resources 600.

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
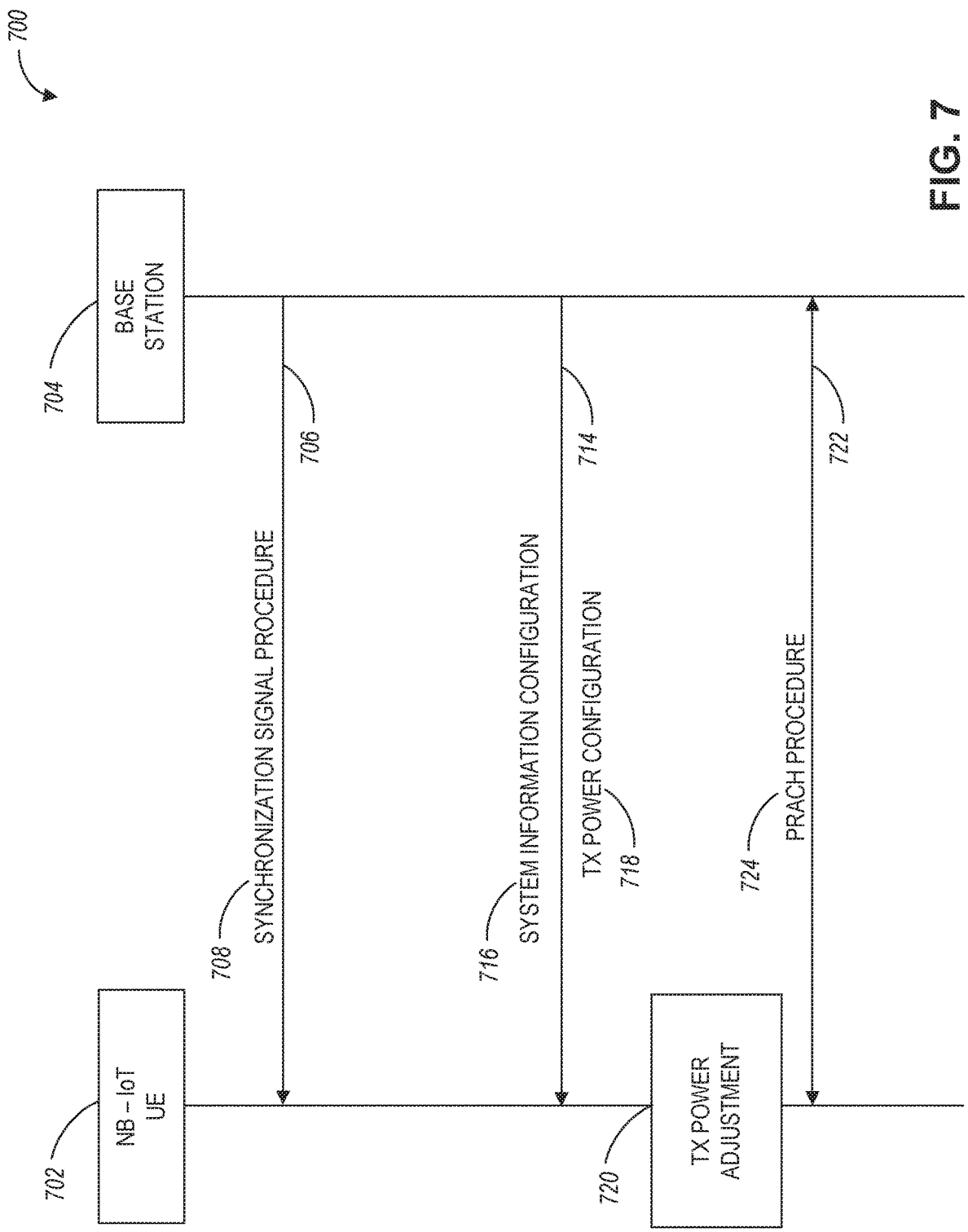
FIG. 7 is an illustration of a communication exchange including communication of transmit power configuration in system information messages, in accordance with some aspects.

FIG. 7 is an illustration of a communication exchange including communication of transmit power configuration in system information messages, in accordance with some aspects. Referring to FIG. 7, the communication exchange 700 can take place between an NB-IoT UE 702 (which can have the same functionalities as UE 101) and a base station 704. The base station 704 can be similar to the eNB 111 but can be used in connection with a small cell or other NB-IoT deployment, such as guardband or standalone NB-IoT deployment.

In some aspects, in order to adapt the transmitting signal to overcome the variations of the wireless channel, power control can be used as one of the possible remedies. For example and in connection with Rel-13 NB-IoT and Rel-14 enhanced NB-IoT (eNB-IoT), the setting of the UE transmit power for a Narrowband Physical Uplink Shared Channel (NPUSCH) transmission can be defined as $P_{NPUSCH,c}(i)$ for NPUSCH transmission in NB-IoT UL slot i for the serving cell c. In instances when the number of repetitions of the allocated NPUSCH resource units (RUs) is greater than 2, then the NPUSCH transmit power can be defined as follows: $P_{NPUSCH,c}(i) = P_{CMAX,c}(i)$ [dBm], otherwise the NPUSCH transmit power can be defined as follows:

$$P_{NPUSCH,c}(i) = \min \begin{cases} P_{CMAX,c}(i), \\ 10\log_{10}(M_{NPUSCH,c}(i)) + P_{O\_NPUSCH,c}(j) + \alpha_c(j) \cdot PL_c \end{cases} [dBm],$$

where, $P_{CMAX,c}(i)$ is the configured UE transmit power in NB-IoT uplink (UL) slot i for serving cell c. More specifically, $P_{CMAX,c}(i)$ can depend on maximum transmit power based on UE category, and also the p-max parameter, which can be indicated in SIB.

Parameter $M_{NPUSCH,c}(i)$ can be $\{1/4\}$ for 3.75 kHz subcarrier spacing, and $\{1, 3, 6, 12\}$ for 15 kHz subcarrier spacing and.

Parameter $P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1 and for serving cell c where j∈{1,2}. For NPUSCH (re)transmissions corresponding to a dynamic scheduled grant, j=1, and for NPUSCH (re)transmissions corresponding to the random access response grant, j=2.

Parameter $P_{O\_UE\_NPUSCH,c}(2)=0$ and $P_{O\_NORMINAL\_NPUSCH,c}(2)=P_{O\_PRE}+\Delta_{PREAMBLE\_Msg3}$, where the parameter preambleInitialReceivedTargetPower can be pre-defined ($P_{O\_PRE}$) and together with parameter $\Delta_{PREAMBLE\_Msg3}$ can be signaled from higher layers for serving cell c.

For j=1, for NPUSCH format 2, $\alpha_c(j)=1$; for NPUSCH format 1, $\alpha_c(j)$ is provided by higher layers for serving cell c. For j=2, $\alpha_c(j)=1$.

Parameter $PL_c$, is the downlink path loss estimate calculated in the UE for serving cell c in dB and $PL_c$=nrs-Power+ nrs-PowerOffsetNonAnchor, which is a higher layer filtered narrowband reference signal receive power (NRSRP), where nrs-Power is provided by higher layers and nrs-powerOffsetNonAnchor is set to zero if it is not provided by higher layers. In some aspects, NRSRP can be pre-defined for serving cell c and the higher layer filter configuration can also be pre-defined for serving cell c.

In some aspects, the TX power configuration information 193A can include the parameters $P_{O\_NPUSCH,c}(j)$ and $\alpha_c(j)$ described above. Depending on how the parameter α is set, the power allocation might vary. For instance, parameter α setting of 0<$\alpha_c$<1 can correspond to fractional power control (i.e., fractional path loss compensation), and can be beneficial in realizing lower interferences to neighboring cells. When instead $\alpha_c$=1, full path loss compensation is adopted, and in this case, the transmit power can be adapted in order to fully compensate for path loss.

In some aspects, repetitions across multiple subframes (for NPRACH and NPUSCH (both format 1 and 2)) can be supported in order to improve coverage. The number of repetitions allowed can be as follows: {1, 2, 4, 8, 16, 32, 64, 128}. In some aspects, for NB-IoT UEs, maximum Tx power can be used when transmitting NPRACH or NPUSCH with repetitions, while open loop power control (OLPC) (i.e., determining transmit power based on the above described equation) can be applied when transmitting with no repetitions. The motivation for such type of transmission can be to minimize the number of time domain repetitions needed by the UE when in deep coverage. However, considering dense small cell deployments, transmissions using maximum transmission power from a cell edge UE that may need repetitions can cause significant inter-cell interference leading to overall system performance degradation. On the other hand, forcing a power control scheme to limit maximum TX power for UEs requiring coverage enhancement can negatively influence the UE's battery life due to the need to rely on larger number of repetitions. Furthermore, different types of UEs are characterized by different maximum transmit power, and have different power allocation capabilities with the aim to mitigate UL/DL link imbalance.

In some aspects, the downlink coverage of base station 704 can be improved considering reduced maximum transmission power of small cells. For example, to better balance the DL/UL link budgets, lower maximum transmission power in the DL can be used by base station 704 in connection with small cell deployments. In this case, the maximum number of repetitions for DL physical channels (e.g., NPDCCH and NPDSCH) may be increased. As an example, the following number of repetitions in the downlink can be used by base station 704 for both NPDCCH and NPDSCH: 1, 2, 4, 8, 16, 32, 64, 128, 256, 512, 1024, 2048, 4096, or 8192 repetitions. In order to further improve performance, NPBCH might be redesigned and persistent scheduling may be used for the SIB1-NB communication (e.g., during operation 716).

Various aspects and techniques disclosed herein can be used to improve intercell interference and achieve a trade-off against UE battery lifetime in dense small cell deployments.

Referring to FIG. 7, at operation 706, a synchronization signal procedure 708 can be performed. For example, the base station 704 can communicate a narrowband primary synchronization signal (NPSS) and a narrowband secondary synchronization signal (NSSS) during the synchronization procedure. At operation 714, system information configuration 716 can be communicated to the NB-IoT UE 702. In some aspects, the system information configuration 716 can be a narrowband system information block (NB-SIB), which can include TX power configuration information 718. In some aspects, the TX power configuration information 718 can include the parameters $P_{O\_NPUSCH,c}(j)$ and $\alpha_c(j)$ described above. At 720, the NB-IoT UE 702 can use the TX power configuration information 718 for determining transmit power for open loop power control (e.g., using the above described transmit power equation). At operation 722, physical random access channel (PRACH) procedure 724 can take place.

In some aspects, in order to limit inter-cell interference, use of open loop transmit power control when repetitions are used to transmit NPRACH or NPUSCH (via the configured $P_{O\_NPDSCH,c}(j)$ and alpha_c values) can be configured for all or some NB-IoT UEs in the cell. This configuration may be signaled via higher layer, e.g., NB-SIB signaling (e.g., 716) or UE-specific RRC signaling.

In some aspects, the use of power control when transmitting with repetitions can be configured on a per-NPRACH resource set basis or corresponding to the number of repetitions to be used for NPUSCH transmissions as indicated via an UL grant by the base station. For example and as seen in FIG. 1A, the transmit power configuration information 193A can be associated with a specific NPRACH resource 191A or can be used for multiple NPRACH resources and/or NPUSCH resources. Such an approach can be useful in achieving a good tradeoff between the generated inter-cell interference and increase in the UE power consumption due to use of larger number of repetitions (longer transmission time) to achieve the same maximum coupling loss (MCL) as with higher transmission power.

Figure 8:
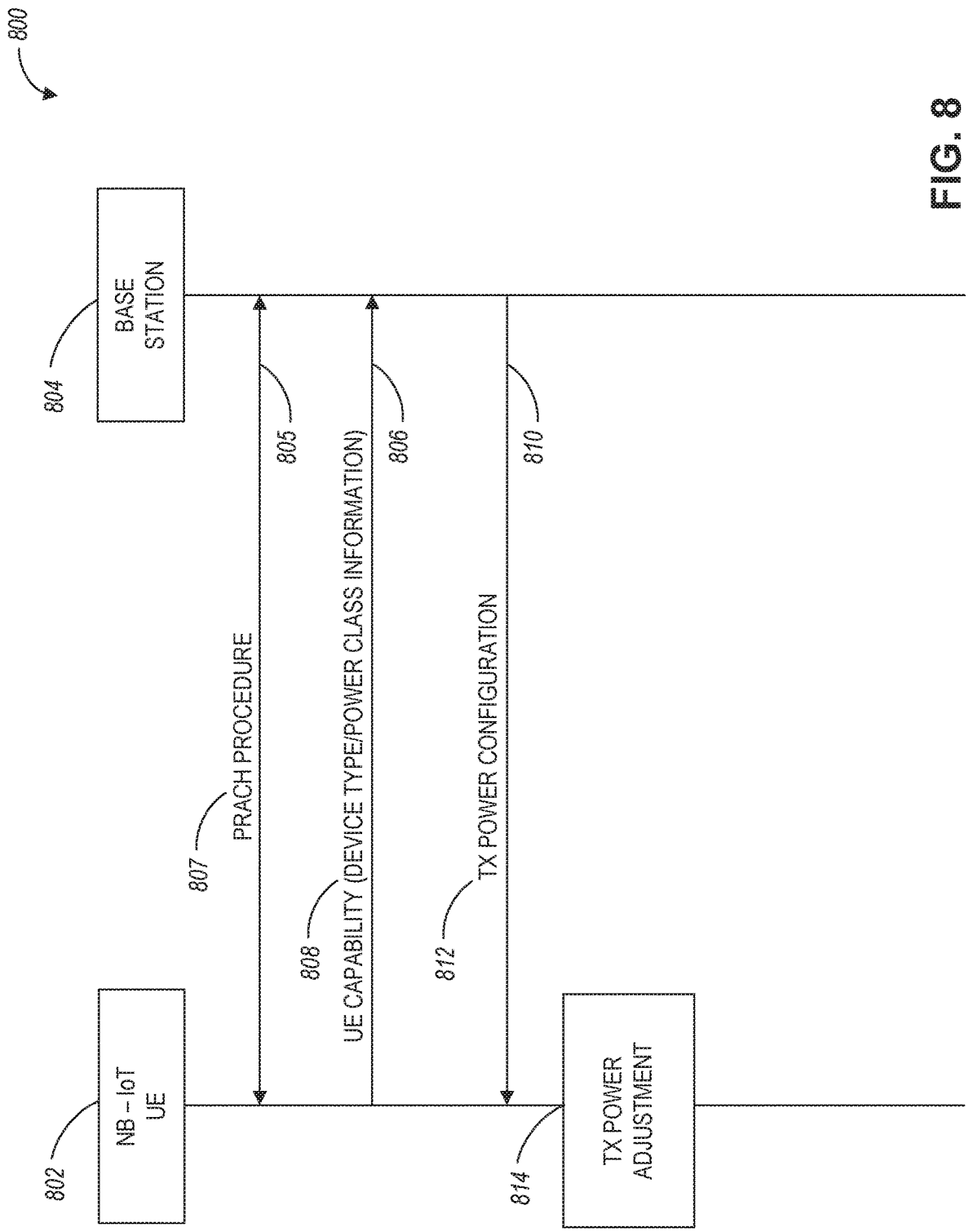
FIG. 8 is an illustration of a communication exchange including communication of transmit power configuration based on device class, in accordance with some aspects.

FIG. 8 is an illustration of a communication exchange including communication of transmit power configuration based on device class, in accordance with some aspects. Referring to FIG. 8 the communication exchange 800 can take place between an NB-IoT UE 802 and a base station 804. In some aspects, the type of power allocation can be based on the UE's maximum transmission power capability which can be associated with the UE device type or class. For example, the table below illustrates LIE classification based on the maximum transmit power:

| UE Type | Max Transmit power |
|---|---|
| Power Class X (PCx) | 14 dBm |
| Power Class 5 (PC5) | 20 dBm |
| Power Class 3 (PC3) | 23 dBm |

In this regard, for a UE with the high maximum transmit power (i.e., UE PC3 or PC5 from the above table), power control with fractional pathloss compensation can be configured to limit inter-cell interference to neighboring cells. On the other hand, for UEs with low maximum transmit power, e.g., with maximum transmission power of 14 dBm, full path loss compensation can be applied when transmitting NPRACH or NPUSCH with repetitions.

Referring again to FIG. 8, at operation 805, a PRACH procedure can take place. After the PRACH procedure, at operation 806, UE capability information 808 (which includes device type and/or power class information) can be communicated from the NB-IoT UE 802 to the base station 804. In response, the base station 804 can communicate TX power configuration information 812 during operation 810. The TX power configuration information can be based on the device type or power class information. At 814, the NB-IoT UE 802 can perform transmit power adjustments based at least on the TX power configuration information 812. In some aspects, the TX power configuration information 718 can include the parameters $P_{O\_NPUSCH,c}(j)$ and $\alpha_c(j)$ described above FIG. 9 is an illustration of a communication exchange including communication of transmit power configuration based on detected device coverage level, in accordance with some aspects.

In some aspects, the power control parameters can depend on the coverage level of the UE (e.g. based on NPRACH coverage level, the maximum number of repetitions Rmax for NPDCCH, or repetition level (RL) used for latest NPUSCH). For example, larger $P_{O\_NPUSCH,c}(j)$ and/or alpha_c may be configured for UEs in deep coverage holes. Thus, the cell-specific part of $P_{O\_NOMINAL\_NPUSCH,c}(1)$, $P_{O\_PRE}$, $\Delta_{PREAMBLE\_Msg3}$ and/or $\alpha_c$ values may be configured on a per-NPRACH resource set basis.

Figure 9:
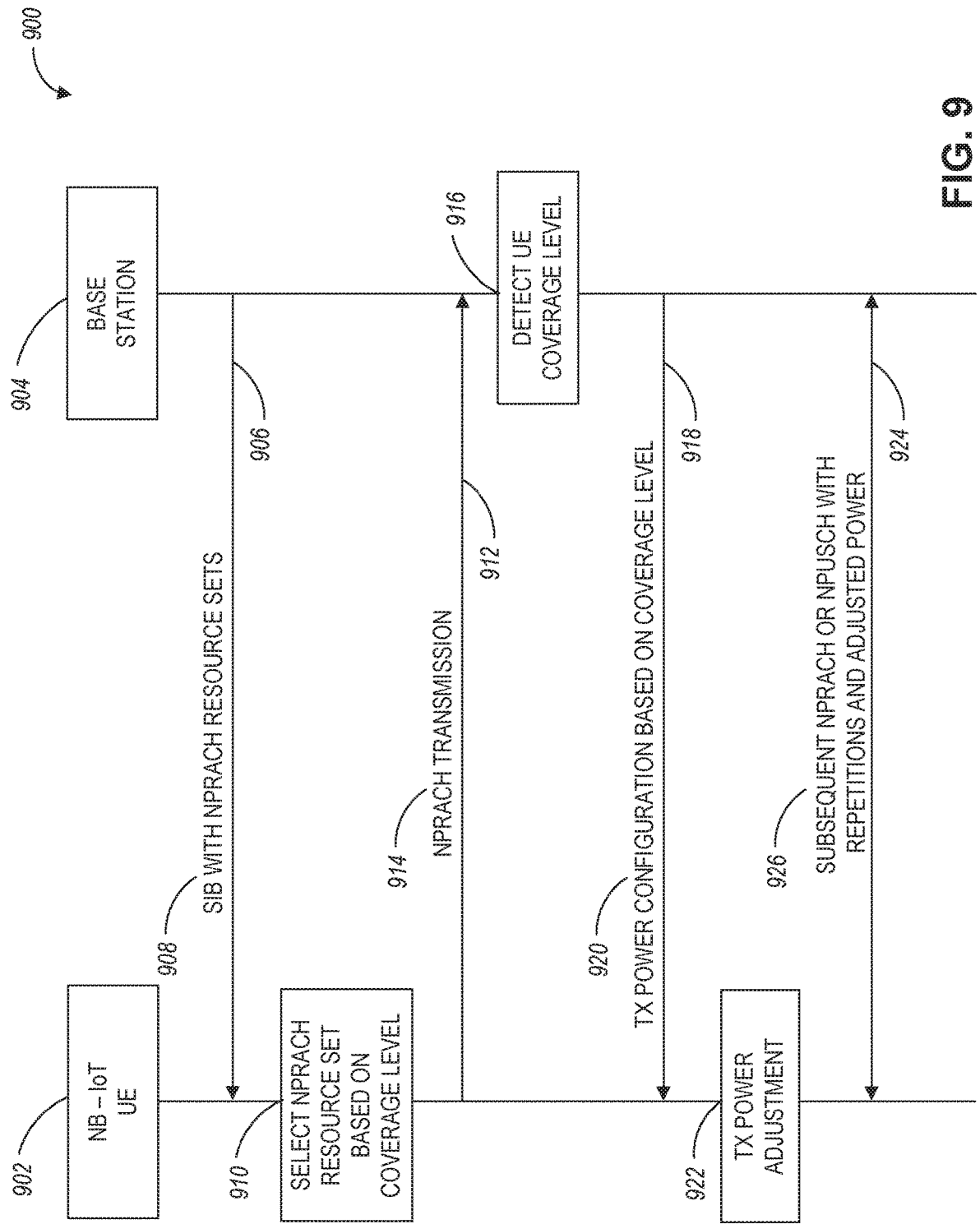
FIG. 9 is an illustration of a communication exchange including communication of transmit power configuration based on detected device coverage level, in accordance with some aspects.

Referring to FIG. 9, the communication exchange 900 Can Take PI, between the NB-IoT UE 902 and the base station 904. At operation 906, system information (e.g., SIB 908) can be communicated to the NB-IoT UE 902. The SIB 908 can include one or more NPRACH resource sets for use by the NB-IoT UE during NPRACH procedure.

At operation 910, the NB-IoT UE 902 select one of the NPRACH resource sets based on coverage level. For example, the base station 904 can provide one or more signal strength threshold values as configuration parameters, and the UE 902 can estimate receive signal strength of signals from the base station. In this regard, the UE 902 can determine a signal coverage level based on a comparison of the estimated signal with the threshold value provided by the base station. The UE 902 can select the NPRACH resource set based on the determine coverage level. In some aspects, the UE 902 can also determine a number of repetitions, such as for NPRACH and NPUSCH communications, based on the comparison of the estimated signal received from the base station with the threshold value.

At operation 912, the NB-IoT UE 902 can perform NPRACH transmission 914 using the selected NPRACH resource set. At operation 916, the base station 904 can detect the UE coverage level based on the NPRACH resource set that was selected and used by the NB-IoT UE 902. At operation 918, the base station 904 can communicate TX power configuration information 920 to the UE 902, where the TX power configuration information 920 is based on the determined coverage level. At operation 922, the NB-IoT UE 902 can perform TX power adjustments using the TX power configuration information 920. At operation 924, subsequent communications 926 of NPRACH or NPUSCH can be performed with repetitions and adjusted transmit power.

In some aspects, power control may be restricted for UEs in deep coverage (e.g., determined based on NPRACH repetition level, Rmax for NPDCCH, or RLs used for latest NPUSCH) (i.e., UEs in deep coverage can be configured to use maximum transmit power). For example, for RLs of NPUSCH>N (e.g., N=16), UEs can be configured to use maximum transmit power. In some aspects, the parameter N can be predefined, or semi-statically configured by RRC signaling. Use of the above techniques can be beneficial since UEs in deep coverage, especially in small cell environments, are more likely to experience large coupling loss due to building penetration loss rather than path loss, and accordingly, may not contribute significantly to increased inter-cell interference.

In some aspects, the power control techniques for different NPUSCH formats can be different, e.g., NPUSCH format 2 communications can use full path loss compensation, while NPUSCH format 1 communications can use fractional path loss compensation.

In some aspects, support of a power control scheme can be signaled by the UE via, e.g., legacy capability signaling. For example, the configuration of such a power control scheme can be signaled via RRC signaling, e.g., through SIB or UE-specific RRC signaling. In other words, the use of a power control scheme, which allows UEs to use maximum transmit power based on their category in deep coverage, and less transmit power with small number of repetitions, can be cell-specifically configured or, alternatively, it can be UE-specifically configured. The power control techniques described herein can be used as a supplementary power control scheme for small cell NB-IoT.

Figure 10A:
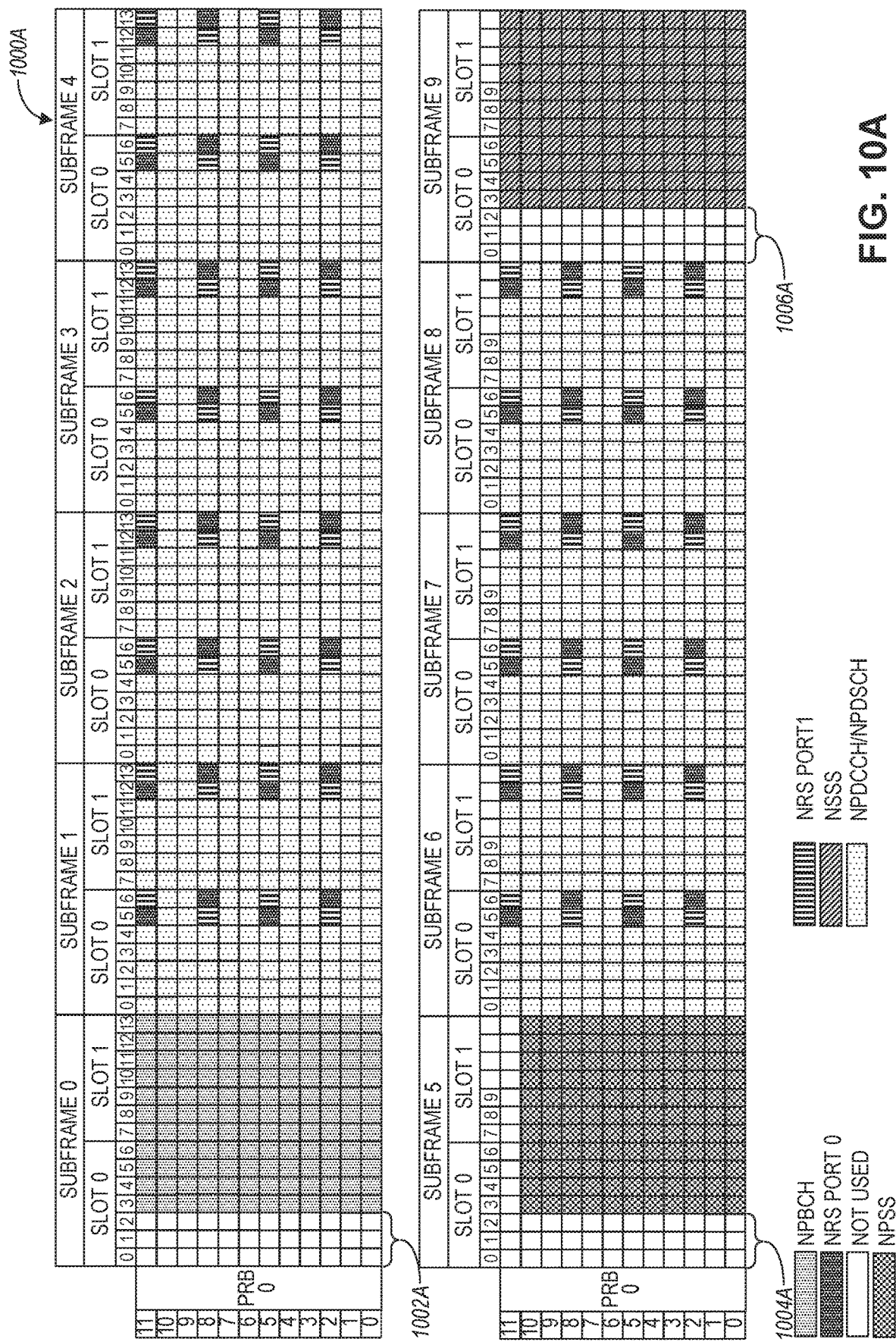
FIG. 10A is an illustration of LTE-NB frame structure of an even radio frame for guardband/standalone deployment, in accordance with some aspects.
Figure 10B:
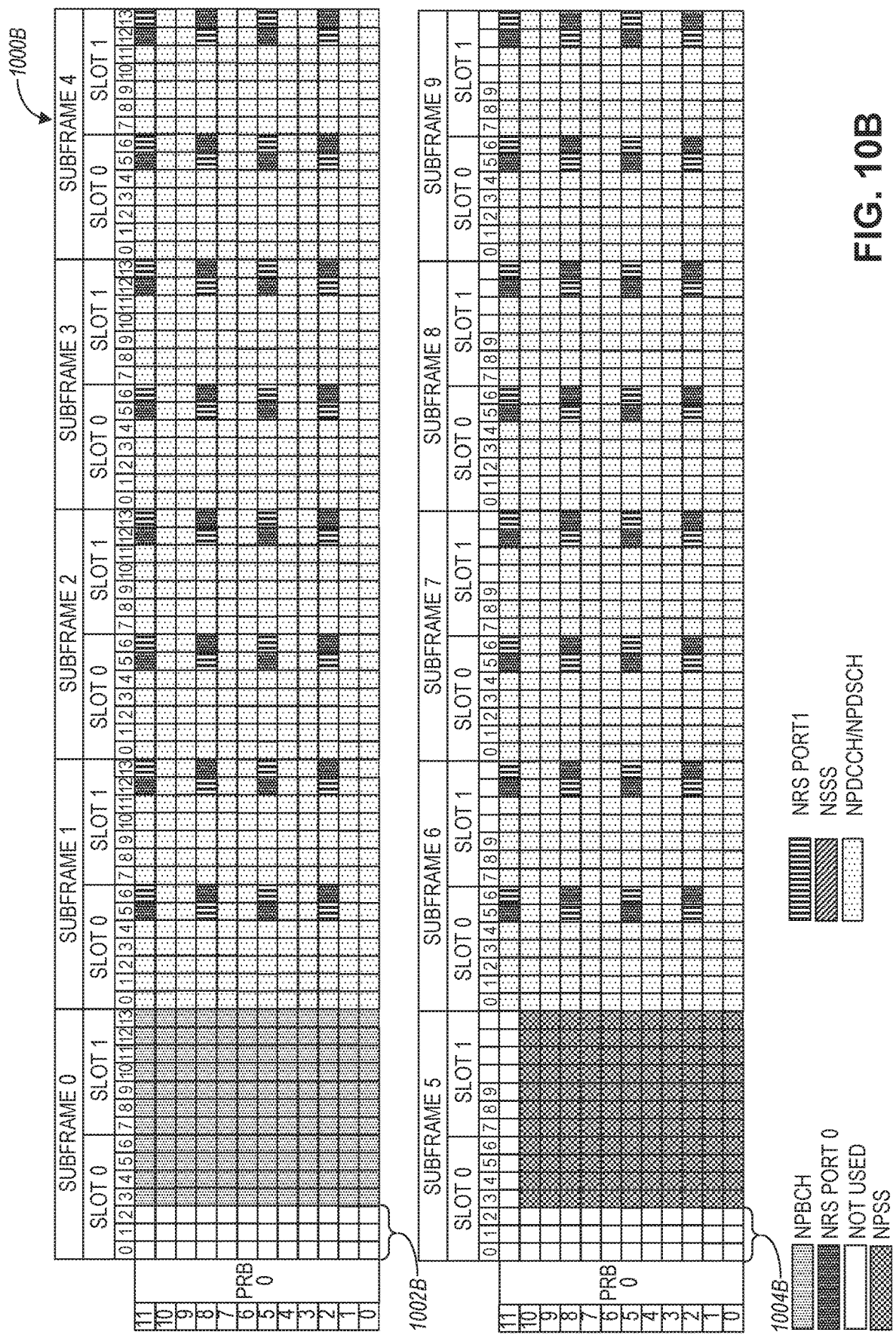
FIG. 10B is an illustration of LTE-NB frame structure of an odd radio frame for guardband/standalone deployment, in accordance with some aspects.

FIG. 10A is an illustration of LTE-NB frame structure of an even radio frame for guardband/standalone deployment, in accordance with some aspects. FIG. 10B is an illustration of LTE-NB frame structure of an odd radio frame for guardband/standalone deployment, in accordance with some aspects. Referring to FIG. 10A, frame 1000A can be used to communicate NPBCH and subframe (SF) 0, narrowband primary synchronization signal (NPSS) in SF 5, and narrowband secondary synchronization signal (NSSS) in SF 9. Referring to FIG. 10B, frame 1000B can be used to communicate NPBCH in SF 0 and NPSS in SF 5.

As seen in FIG. 10A and FIG. 10B, when the UE is operating in standalone and guard-band modes, there is no need to reserve the first 3 symbols of a frame as there is no legacy control region to be reserved, and thus the first 3 symbols (e.g., subframe portions 1002A, 1004A, 1006A, 1002B, and 1004B) can be exploited for further optimization of NB-IoT systems. Techniques disclosed herein can be used to extend the existing NPSS/NSSS/NPBCH design, exploiting the first 3 symbols in subframes communicating NPBCH, NPSS and NSSS (e.g., subframe portions 1002A, 1004A, 1006A, 1002B, and 1004B).

In some aspects, one or more of the following techniques can be used for NPSS enhancements. In some aspects, Zadoff-Chu (ZC) sequence of length 11 with root index 5 and no shift can be used as NPSS sequence in NB-IoT architectures. In time domain, the ZC sequence can be repeated 11 times in symbols #3 to #13. In frequency domain, the length-11 ZC sequence can be mapped from subcarrier #0 to #10 in NB-IoT carrier (i.e., in a single PRB). To extend the NPSS to utilized 14 symbols in a subframe (e.g., SF 5), the following example alternatives can be considered.

(a) in some aspects, the same ZC sequence can be used and repeated 14 times, in symbols #0 to #13 of the subframe. In some aspects, a length-14 cover code with low cross-correlation with existing length-11 cover code can be used. In one aspect, the cover code can be complex number, e.g., based on quadrature phase shift keying (QPSK), comprising, e.g., +1, +j, −1, and −j. Alternatively, the cover code can be based on binary phase shift keying (BPSK), comprising, e.g., +1 and −1. In another aspect, the cover code for any 3 symbols of a Rel-13 NPSS (i.e., NPSS occupying 11 symbols in a subframe) can be applied to the first 3 symbols. For example, the cover code [1, 1, −1] or [1−1 1] can be used.

(b) In some aspects, a different ZC sequence can be used for first 3 symbols, while the following 11 symbols can still carry a Rel-13 NB-IoT NPSS.

(c) In some aspects, a new NPSS sequence occupying 14 symbols can be introduced. For example, a ZC sequence with length-11 and root index 6 can be used, which can be the complex conjugate sequence of a Rel-13 NPSS, and thus may reduce some complexity.

(d) In some aspects, any portion of an existing 11 symbol NPSS can be copied to the first 3 symbols. One example is to extend the current Rel-13 NPSS via cyclic extension. The copied level can be OFDM symbol granularity, e.g., copying the last 3 NPSS symbols to first 3 symbols.

In some aspects, one or more of the following techniques can be used for NSSS enhancements. NB-IoT NSSS can be composed of length-131 ZC sequence, time-domain cyclic shifts, and length-128 Hadamard sequence for scrambling. The scrambled length-132 sequence (with cyclic extension from length-131 ZC and length-128 Hadamard sequences) can be mapped to 11 symbols and 12 subcarriers.

In some aspects, NSSS can be extended to occupy 14 symbols (e.g., and SSS can occupy all 14 symbols of SF 9 in FIG. 10A). In this regard, the following example alternatives can be considered:

(a) In some aspects, any portion of existing NSSS (e.g., Rel-13 or Rel-14 NSSS) can be copied to the first 3 symbols. In some aspects, the copied level can be OFDM symbol granularity. For example, a NSSS can be extended to length-168 and occupy 14 symbols within a subframe via cyclic extension. The extended portion (i.e., length-36 symbols) can be mapped to the first 3 symbols. The time domain cyclic shift (which can be the same as Rel-13 NSSS) can be applied to the first 3 symbols as well. The NSSS on symbols #3 to #13 can be the same as the Rel-13 NSSS.

(b) In some aspects, the Rel-13 NSSS sequence from symbols #3 to #5 can be copied to symbols #0 to #2 within the subframe carrying NSSS. Alternatively, any 3 symbols of Rel-13 NSSS can be copied to the first 3 symbols. The NSSS on symbols #3 to #13 can be the same as the Rel-13 NSSS.

(c) In some aspects, a new ZC sequence can be introduced for NSSS in the first 3 symbols of the subframe carrying NSSS. For example, a length-31 ZC sequence can be used, with cyclic extension to length-36 to fit into the first three symbols. In some aspects, the sequence can depend on cell ID (e.g., the root index of the length-31 sequence can be mod(Cell ID, 31)).

Figure 11:
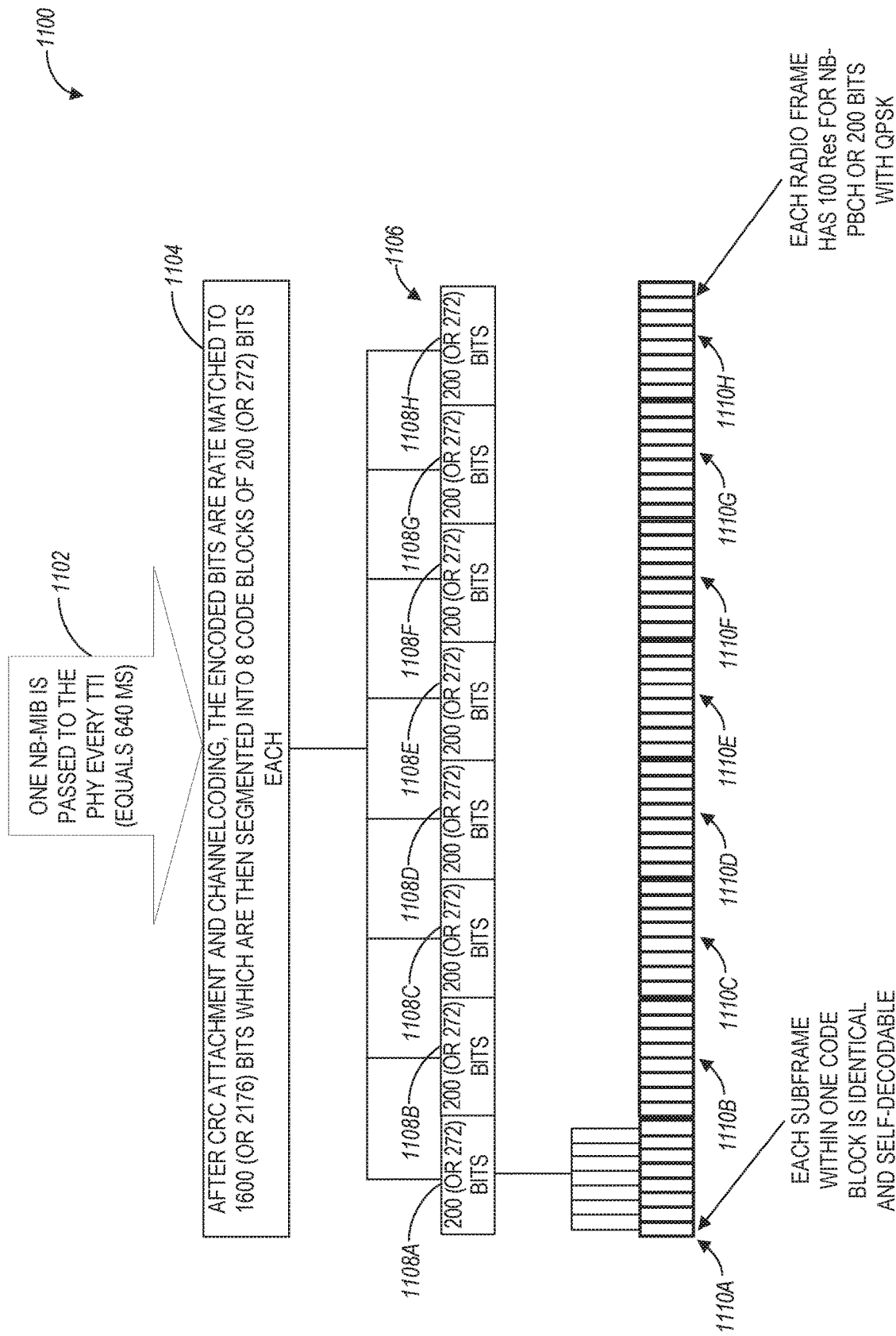
FIG. 11 is an illustration of NPBCH generation, in accordance with some aspects.

FIG. 11 is an illustration of NPBCH generation, in accordance with some aspects. Referring to FIG. 11, the NPBCH generation process 1100 can start at operation 1102 when one narrowband master information block (NB-MIB) is passed to the PHY every transmission time interval (TTI), which equals 640 ms. At operation 1104, after CRC attachment and channel coding, the encoded bits can be rate matched to 1600 bits, which are then segmented into 8 code blocks (1108A-1108H) of 200 bits each during operation 1106. Each of the code blocks 1108A-1108H can be self-decodable, and each of the code blocks can have a different bit ordering. An NB-IoT UE can detect the 80 ms boundary of the blocks using the NSSS. Each of the 8 code blocks 1108A-1108H can be mapped to 1 subframe and repeated 8 times. In this regard, the Nth block is transmitted in every subframe #0 within Nth 80 ms duration. As seen in FIG. 11, Block 1108A is mapped to a set of eight subframes 1110A, and similarly, blocks 1108 be through 1108H are mapped to corresponding sets of subframes 1110B through 1110H.

In some aspects, one or more of the following techniques can be used to extend the current NPBCH to occupy 14 symbols (e.g., occupy all symbols of SF 0 within the frames illustrated in FIG. 10A and FIG. 10B):

(a) In some aspects, any symbol of Rel-13 NPBCH (e.g., the NPBCH illustrated in FIG. 10A and FIG. 10B occupying 11 symbols of a subframe) can be repeated in the first 3 symbols. For example, the Rel-13 NPBCH in symbols #3 to #5 can be copied to symbols #0 to #2. This process can facilitate frequency offset tracking based on estimation of the phase ramp between each pair of repeated symbols.

(b) In some aspects, the rate matching method for NPBCH can be changed, taking into account 3 more symbols in each NPBCH subframe. For example and as seen in FIG. 11, the NB-MIB after CRC attachment and channel coding, can be rate matched to 2176 bits (instead of 1600 bits), which are then segmented into 8 code blocks of 272 bits (instead of 200 bits) each. The 272 bits can be mapped to 14 symbols in a subframe, excluding the resource elements used for CRS and NRS in the last 11 symbols.

In some aspects, one or more of the following techniques can be used to detect the use of the first three symbols for NPSS, NSSS, and NPBCH.

In some aspects, a UE may perform blind detection to determine whether or not the first three symbols are used for NPSS. Alternatively, in aspects when NPSS uses different sequence that a Rel-13 or Rel-14 NPSS sequence, by detecting the presence of a new NPSS sequence, the UE can determine the use of the first three symbols. In some aspects, a new NPSS sequence with root index 6 can be used, which can be the complex conjugate sequence of Rel-13 NPSS. The detection can be based on cross-correlation for sequence on the last 11 symbols in the subframe. The complexity can be kept the same (i.e., UE can be configured to perform the same number of correlation operations compared to Rel-13 NB-IoT NPSS detection).

In some aspects, a different cover code can be used for NPSS occupying 14 symbols, and thus by detecting the presence of the NPSS using a new cover code, the UE can determine the use of the first three symbols for NPSS.

In some aspects, a UE may perform blind detection to determine whether or not the first three symbols are used for NSSS. Alternatively, the use of first 3 symbols for NSSS and NPSS can be the same, and by detecting NPSS, the UE determines that the first 3 symbols are also used for NSSS.

In some aspects, the UE may perform hypothesis tests on the use of first 3 symbols for NPBCH. Alternatively, the use of first 3 symbols for NPSS/NSSS and NPBCH can be the same, and by detecting NPSS/NSSS, the UE determines whether the first 3 symbols are used for NPBCH.

In some aspects, the use of first 3 symbols can be indicated by another sequence. In one example, the REs used for legacy cell specific reference signal (CRS) can be used for carrying a predefined sequence to indicate the use of first 3 symbols for NPBCH. For example, phase rotated CRS/NRS sequence (e.g., multiplied by −1) can be used.

In some aspects, a different narrowband reference signal (NRS) sequence can be used for resource elements carrying NRS. For example, phase rotated NRS sequence (e.g., multiplied by −1) can be used. By first detecting whether the predefined sequence is used, a UE can also determine whether the first 3 symbols are used for NPBCH.

Figure 12:
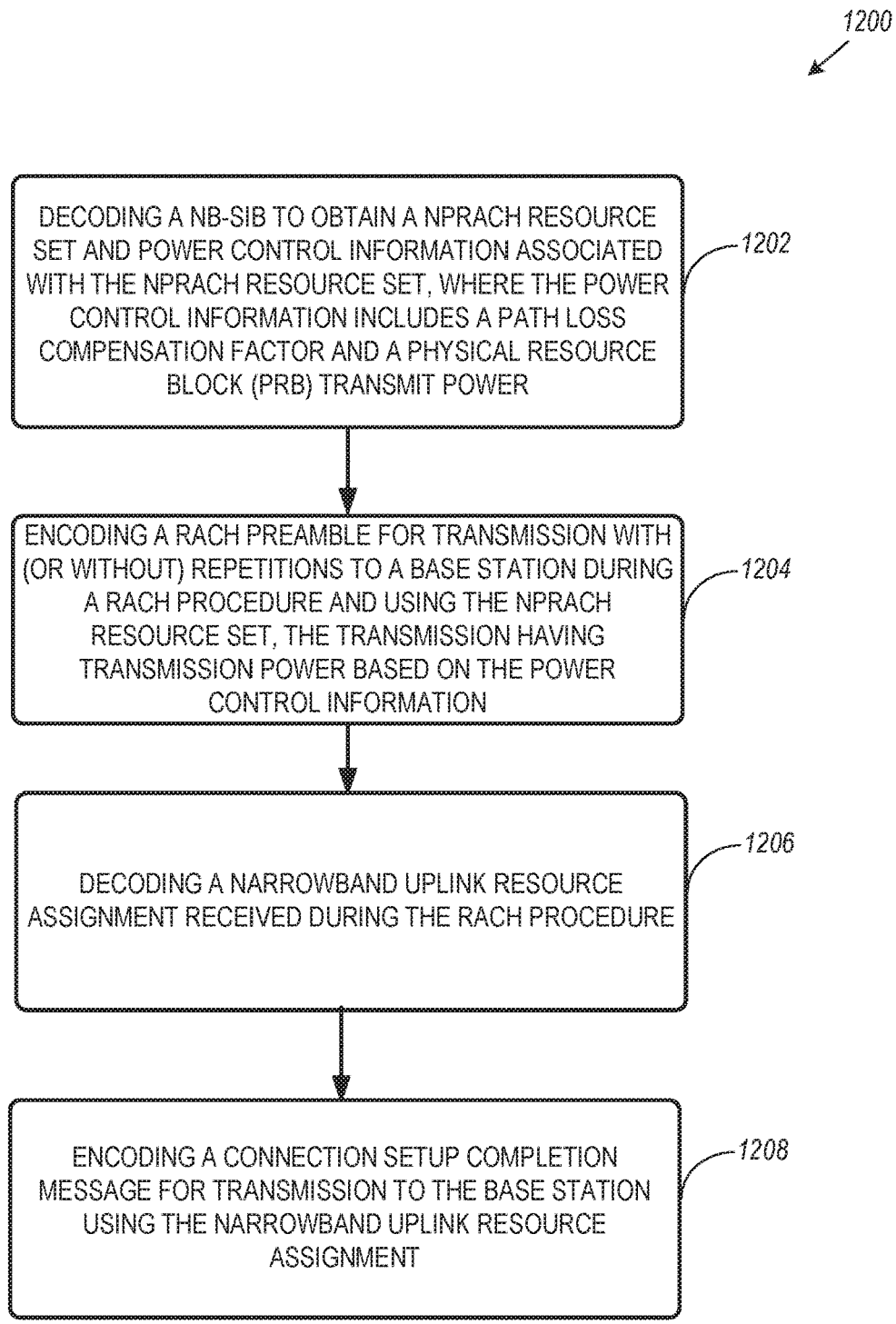
FIG. 12 illustrates generally a flowchart of an example method of operating an Internet-of-Things UE (IoT UE) within a small cell architecture, in accordance with some aspects.

FIG. 12 illustrates generally a flowchart of an example method of operating an Internet-of-Things UE (IoT UE) within a small cell architecture, in accordance with some aspects. Referring to FIG. 12, the example method 1200 can start at operation 102 when a Narrowband Internet-of-Things (NB-IoT) user equipment (UE) can decode a narrowband system information block (NB-SIB) to obtain a narrowband physical random access channel (NPRACH) resource set (e.g., 191A) and power control information (e.g., 193A) associated with the NPRACH resource set. The power control information can include a path loss compensation factor and/or a physical resource block (PRB) transmit power. The power control information can include one or more other parameters that can be used to determine NPUSCH transmit power according to the equation:

$$P_{NPUSCH,c}(i) = \min\left\{ \begin{array}{l} P_{CMAX,c}(i), \\ 10\log_{10}(M_{NPUSCH,c}(i)) + P_{O\_NPUSCH,c}(j) + \alpha_c(j) \cdot PL_c \end{array} \right\},$$

which power can be used when transmitting data or control signals to the base station with repetitions.

At operation 1204, a random access channel (RACH) preamble can be encoded for transmission wit repetitions to a base station during a RACH procedure and using the NPRACH resource set. The transmission with repetitions can be performed with transmission power based on the power control information. For example, the communication of the RACH preamble can take place during the RACH procedure 724. At operation 1206, a narrowband uplink resource assignment received during the RACH procedure can be decoded. At operation 1208, a connection setup completion message can be encoded for transmission to the base station using the narrowband uplink resource assignment.

Figure 13:
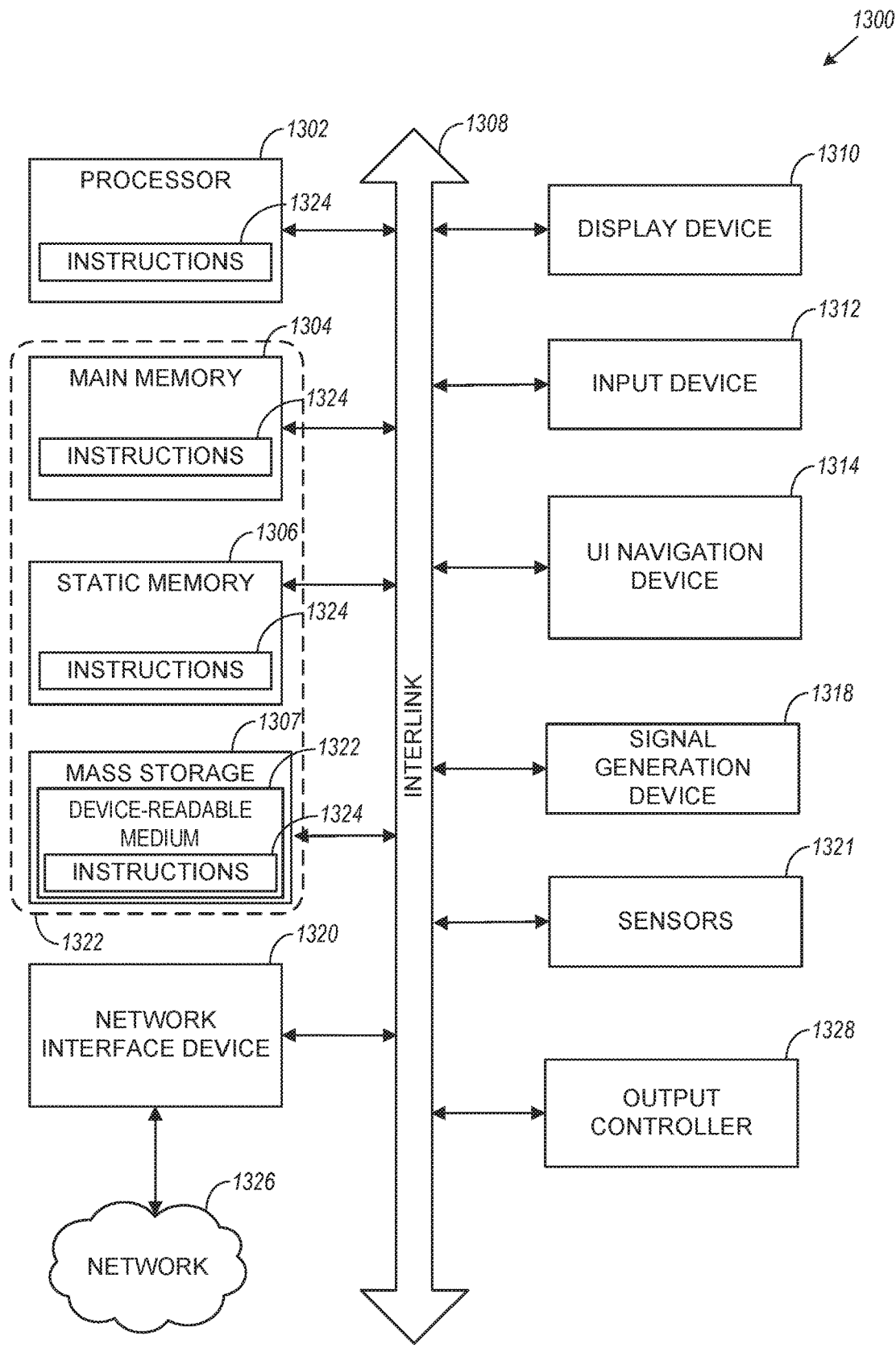
FIG. 13 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 13 illustrates a block diagram of a communication device such as an evolved Node-B (eNB), a new generation Node-B (gNB), an access point (AP), a wireless station (STA), a mobile station (MS), or a user equipment (UE), in accordance with some aspects. In alternative aspects, the communication device 1300 may operate as a standalone device or may be connected (e.g., networked) to other communication devices.

Circuitry (e.g., processing circuitry) is a collection of circuits implemented in tangible entities of the device 1300 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa.

The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1300 follow.

In some aspects, the device 1300 may operate as a standalone device or may be connected (e.g., networked) to other devices. In a networked deployment, the communication device 1300 may operate in the capacity of a server communication device, a client communication device, or both in server-client network environments. In an example, the communication device 1300 may act as a peer communication device in peer-to-peer (P2P) (or other distributed) network environment. The communication device 1300 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), an other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1300 may include a hardware processor 1302 (e.g., a central processing unit (CPU), a graphics processing unit (GPU), a hardware processor core, or any combination thereof), a main memory 1304, a static memory 1306, and mass storage 1307, (e.g., hard drive, tape drive, flash storage, or other block or storage devices), some or all of which may communicate with each other via an interlink (e.g., bus) 1308.

The communication device 1300 may further include a display device 1310, an alphanumeric input device 1312 (e.g., a keyboard), and a user interface (UI) navigation device 1314 (e.g., a mouse). In an example, the display device 1310, input device 1312 and UI navigation device 1314 may be a touch screen display. The communication device 1300 may additionally include a signal generation device 1318 (e.g., a speaker), a network interface device 1320, and one or more sensors 1321, such as a global positioning system (GPS) sensor, compass, accelerometer, or other sensor. The communication device 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1307 may include a communication device-readable medium 1322, on which is stored one or more sets of data structures or instructions 1324 (e.g., software) embodying or utilized by any one or more of the techniques or functions described herein. In some aspects, registers of the processor 1302, the main memory 1304, the static memory 1306, and/or the mass storage 1307 may be, or include (completely or at least partially), the device-readable medium 1322, on which is stored the one or more sets of data structure or instructions 1324, embodying or utilized by any one or more of the techniques or functions described herein. In an example, one or any combination of the hardware processor 1302, the main memory 1304, the static memory 1306, or the mass storage 1316 may constitute the device-readable medium 1322.

As used herein, the term "device-readable medium" is interchangeable with "computer-readable medium" or "machine-readable medium". While the communication device-readable medium 1322 is illustrated as a single medium, the term "communication device-readable medium" may include a single medium or multiple media (e.g., a centralized or distributed database, and/or associated caches and servers) configured to store the one or more instructions 1324.

The term "communication device-readable medium" may include any medium that is capable of storing, encoding, or carrying instructions (e.g., instructions 1324) for execution by the communication device 1300 and that cause the communication device 1300 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as a semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1324 may further be transmitted or received over a communication network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15 4 family of standards, a Long Term Evolution (LTE) family of standards, a Universal Mobile Telecommunications System (UMTS) family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), MIMO, or multiple-input single-output (MISO) techniques. In some examples, the network interface device 1320 may wirelessly communicate using Multiple User MIMO techniques.

The term "transmission medium" shall be taken to include any intangible medium that is capable of storing, encoding or carrying instructions for execution by the communication device 1300, and includes digital or analog communications signals or other intangible medium to facilitate communication of such software. In this regard, a transmission medium in the context of this disclosure is a device-readable medium.

Additional Notes and Examples

Example 1 is an apparatus of a Narrowband Internet-of-Things (NB-IoT) user equipment (UE), the apparatus comprising: processing circuitry, wherein to configure the NB-IoT UE for open loop transmit power control, the processing circuitry is to: decode a narrowband system information block (NB-SIB) to obtain a narrowband physical random access channel (NPRACH) resource set and power control information associated with the NPRACH resource set; encode a random access channel (RACH) preamble for transmission to a base station during a RACH procedure and using the NPRACH resource set, the transmission having transmission power based on the power control information; decode a narrowband uplink resource assignment received during the RACH procedure; and encode a connection setup completion message for transmission to the base station using the narrowband uplink resource assignment; and memory coupled to the processing circuitry, the memory configured to store th eNB-SIB.

In Example 2, the subject matter of Example 1 includes, wherein the power control information comprises a path loss compensation factor and a physical resource block (PRB) transmit power.

In Example 3, the subject matter of Examples 1-2 includes, wherein the RACH preamble is encoded for transmission without repetitions or transmission with repetitions.

In Example 4, the subject matter of Examples 2-3 includes, wherein the processing circuitry is configured to: determine the transmission power of the RACH preamble transmission based on the following equation:

$$P_{NPUSCH,c}(i) = \min\left\{\begin{array}{l}P_{CMAX,c}(i),\\ 10\log_{10}(M_{NPUSCH,c}(i)) + P_{O\_NPUSCH,c}(j) + \alpha_c(j) \cdot PL_c\end{array}\right\}$$

dBm, where $P_{CMAX,c}(i)$ is configured UE transmit power in NB-IoT slot i for serving cell c, $P_{O\_NPUSCH,c}(j)$ is the PRB transmit power, $M_{NPUSCH,c}(i)$ is the number of allocated PRBs, $\alpha_c(j)$ is the path loss compensation factor, and $PL_c$ is a downlink path loss estimate determined at the NB-IoT UE.

In Example 5, the subject matter of Examples 1-4 includes, wherein the processing circuitry is further configured to: decode configuration information received via a narrowband physical downlink control channel (NPDCCH), the configuration information including a second uplink resource assignment; and encode data for transmission on a narrowband physical uplink shared channel (NPUSCH) using the second uplink resource assignment, the data transmission having transmission power based on the power control information.

In Example 6, the subject matter of Example 5 includes, wherein the data is encoded for transmission on the NPUSCH with repetitions.

In Example 7, the subject matter of Examples 5-6 includes, wherein the configuration information received via the NPDCCH further includes a number of the transmission repetitions of the data on the NPUSCH.

In Example 8, the subject matter of Example 7 includes, wherein the number of the transmission repetitions of the data on the NPUSCH is based on a format of the NPUSCH.

In Example 9, the subject matter of Examples 1-8 includes, wherein the processing circuitry is further configured to: decode UE-specific radio resource control (RRC) signaling, the RRC signaling including the power control information; and encode data for transmission on a narrowband physical uplink shared channel (NPUSCH) or a narrowband physical random access channel (NPRACH), the data transmission having transmission power based on the power control information obtained via the RRC signaling.

In Example 10, the subject matter of Examples 1-9 includes, wherein the processing circuitry is further configured to: encode the RACH preamble for transmission during the RACH procedure and using the NPRACH resource set, wherein the NPRACH resource set is associated with a single physical resource block (PRB).

In Example 11, the subject matter of Example 10 includes, wherein the single PRB has a bandwidth of 180 kHz.

In Example 12, the subject matter of Examples 1-11 includes, wherein the processing circuitry is further configured to: detect a narrowband primary synchronization signal (NPSS) in a first subframe of a received frame, detect a narrowband secondary synchronization signal (NSSS) in a second subframe of the received frame; determine a physical layer cell identity (PCI) of a cell of the base station based on the NPSS and the NSSS; and perform a random access procedure with the cell based on the PCI.

In Example 13, the subject matter of Example 12 includes, wherein to detect the NPSS, the processing circuitry is further configured to: detect a NPSS sequence occupying fourteen symbols of the first subframe based on sequence cross-correlation of last eleven symbols of the first subframe.

In Example 14, the subject matter of Examples 12-13 includes, wherein to detect the NPSS, the processing circuitry is further configured to: detect 14 symbols of the first subframe include 14 corresponding copies of a same Zadoff-Chu (ZC) sequence; and apply a length-14 cover code to the ZC sequence in each symbol of the first subframe to obtain the NPSS.

In Example 15, the subject matter of Example 14 includes, wherein the length-14 cover code comprises a complex number based on quadrature phase shift keying (QPSK) modulation.

In Example 16, the subject matter of Examples 12-15 includes, wherein to detect the NPSS, the processing circuitry is further configured to: perform blind detection to determine first three symbols in the first subframe are occupied; and upon determining the first three symbols are occupied, apply a length-14 cover code to a Zadoff-Chu sequence occupying 14 symbols of the first subframe, wherein the Zadoff-Chu sequence is associated with length-11 and root index 6.

In Example 17, the subject matter of Examples 12-16 includes, wherein to detect the NSSS, the processing circuitry is further configured to: perform blind detection to determine first three symbols in the second subframe are occupied; and upon determining the first three symbols are occupied, decoding a length-168 NSSS sequence occupying 14 symbols of the second subframe and 12 subcarriers of a single PRB.

In Example 18, the subject matter of Example 17 includes, wherein the length-168 NSSS sequence comprises a length-36 cyclic extension sequence, occupying the first three symbols in the second subframe.

In Example 19, the subject matter of Examples 12-18 includes, wherein to detect the NSSS, the processing circuitry is further configured to: perform blind detection to determine first three symbols numbered #0-#2 in the second subframe are occupied; and upon determining the first three symbols are occupied, decoding a NSSS sequence occupying 14 symbols of the second subframe numbered #0-#13 and 12 subcarriers of a single PRB, wherein a portion of the NSS sequence in symbols #0-#2 is copied from a remaining portion of the NSSS sequence within three of the symbols numbered #3-#13.

In Example 20, the subject matter of Examples 12-19 includes, wherein to detect the NSSS, the processing circuitry is further configured to: perform blind detection to determine first three symbols numbered #0-#2 in the second subframe are occupied; and upon determining the first three symbols are occupied, decoding a first NSSS sequence in symbols #0-#2 and a second NSSS sequence in symbols #3-#13 in the second subframe.

In Example 21, the subject matter of Example 20 includes, wherein the first NSSS sequence is a length-31 Zadoff-Chu sequence with a cyclic extension to a length-36 sequence, and wherein a root index of the length-13 sequence is based on a cell ID of the cell of the base station.

In Example 22, the subject matter of Examples 1-21 includes, transceiver circuitry coupled to the processing circuitry; and, one or more antennas coupled to the transceiver circuitry.

Example 23 is an apparatus of a base station, the apparatus comprising: processing circuitry, configured to: encode system frame number (SFN) information within a narrowband master information block (NB-MIB) using a set of narrowband physical broadcast channel (NPBCH) symbols for transmission to a user equipment (UE) within a downlink frame, wherein the NPBCH symbols occupy at least 14 symbols in a single subframe of the downlink frame; encode uplink channel configuration information within a narrowband system information block (NB-SIB) based on the SFN information, the NB-SIB including a narrowband physical random access channel (NPRACH) resource set and power control information for setting transmission power when transmitting data with repetitions using the NPRACH resources set; and decode a random access channel (RACH) preamble during a RACH procedure with the UE based on the uplink channel configuration information, to grant a narrrowband uplink resource assignment to the UE, wherein the RACH preamble is received with repetitions via the NPRACH resource set; and memory coupled to the processing circuitry, the memory configured to store the uplink channel configuration information.

In Example 24, the subject matter of Example 23 includes, wherein the single subframe comprises 14 NPBCH symbols numbered as symbols #0 through #13, and the processing circuitry is further configured to: replicate three NPBCH symbols selected from the symbols #3-#13 into symbols #0-#2 of the single subframe.

In Example 25, the subject matter of Examples 23-24 includes, wherein to encode the NB-MIB, the processing circuitry is further configured to: rate match the NPBCH symbols to 2176 bits, segmented into 8 code blocks of 272 bits each; and map each of the 272 bits of the 8 code blocks to 14 symbols of multiple subframes for transmission to the UE.

In Example 26, the subject matter of Examples 23-25 includes, wherein the power control information comprises a path loss compensation factor and a physical resource block (PRB) transmit power.

In Example 27, the subject matter of Examples 23-26 includes, wherein the processing circuitry is further configured to: encode a narrowband primary synchronization signal (NPSS) in a first subframe of a downlink frame; and encode a narrowband secondary synchronization signal (NSSS) in a second subframe of the downlink frame.

In Example 28, the subject matter of Example 27 includes, wherein to encode the NPSS, the processing circuitry is further configured to: encode a Zadoff-Chu NPSS sequence within 14 symbols of the first subframe of the downlink frame, wherein the Zadoff-Chu NPSS sequence is associated with length-11 and root index 6 or length-11 and root index 5.

In Example 29, the subject matter of Examples 27-28 includes, wherein to encode the NSSS, the processing circuitry is further configured to: encode a Zadoff-Chu NSSS sequence of length-168 within 14 symbols of the second subframe of the downlink frame and 12 subcarriers of a single PRB.

In Example 30, the subject matter of Example 29 includes, wherein the length-168 NSSS sequence comprises a length-36 cyclic extension sequence, occupying the first three symbols in the second subframe.

In Example 31, the subject matter of Examples 23-30 includes, wherein the processing circuitry is further configured to: encode configuration information for transmission to the UE via a narrowband physical downlink control channel (NPDCCH), the configuration information including a second uplink resource assignment and a number of transmission repetitions for data transmission by the UE using a narrowband physical uplink shared channel (NPUSCH).

In Example 32, the subject matter of Example 31 includes, wherein the processing circuitry is further configured to cause transmission of the encoded configuration information via the NPDCCH with 4096 or 8192 repetitions.

In Example 33, the subject matter of Examples 23-32 includes, wherein the base station is a next generation Node-B (gNB) or an evolved Node-B (eNB).

In Example 34, the subject matter of Examples 23-33 includes, transceiver circuitry coupled to the processing circuitry; and, one or more antennas coupled to the transceiver circuitry.

Example 35 is a computer-readable storage medium that stores instructions for execution by one or more processors of a Narrowband Internet-of-Things (NB-IoT) user equipment (UE), the instructions to configure the one or more processors to cause the UE to: decode a narrowband system information block (NB-SIB) to obtain a narrowband physical random access channel (NPRACH) resource set and power control information associated with the NPRACH resource set, wherein the power control information comprises a path loss compensation factor and a physical resource block (PRB) transmit power; encode a random access channel (RACH) preamble for transmission with repetitions to a base station during a RACH procedure and using the NPRACH resources set, the transmission having transmission power based on the power control information, decode a narrowband uplink resource assignment received during the RACH procedure; and encode a connection setup completion message for transmission to the base station using the narrowband uplink resource assignment.

In Example 36, the subject matter of Example 35 includes, wherein the instructions further configure the one or more processors to cause the UE to: detect a narrowband primary synchronization signal (NPSS) in a first subframe of a received frame; detect a narrowband secondary synchronization signal (NSSS) in a second subframe of the received frame; determine a physical layer cell identity (PCI) of a cell of the base station based on the NPSS and the NSSS; and perform a synchronization procedure with the cell.

In Example 37, the subject matter of Examples 35-36 includes, wherein to detect the NPSS, the instructions further configure the one or more processors to cause the UE to: detect a NPSS sequence occupying fourteen symbols of the first subframe based on sequence cross-correlation of last eleven symbols of the first subframe.

In Example 38, the subject matter of Examples 35-37 includes, wherein to detect the NPSS, the instructions further configure the one or more processors to cause the UE to: detect 14 symbols of the first subframe include 14 corresponding copies of a same Zadoff-Chu (ZC) sequence; and apply a length-14 cover code to the ZC sequence in each symbol of the first subframe to obtain the NPSS.

In Example 39, the subject matter of Examples 35-38 includes, wherein to detect the NSSS, the instructions further configure the one or more processors to cause the UE to: perform blind detection to determine first three symbols in the second subframe are occupied; and upon determining the first three symbols are occupied, decoding a length-168 NSSS sequence occupying 14 symbols of the second subframe and 12 subcarriers of a single PRB.

Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:
1. An apparatus comprising:
   processing circuitry, wherein, to configure a Narrowband Internet-of-Things (NB-IoT) user equipment (UE) for open loop transmit power control, the processing circuitry is configured to:
      decode a narrowband system information block (NB-SIB) to obtain a narrowband physical random access channel (NPRACH) resource set and power control information associated with the NPRACH resource set;

encode a random access channel (RACH) preamble for transmission to a base station during a random access procedure and using the NPRACH resource set, the transmission having transmission power based on the power control information.

2. The apparatus of claim 1, wherein the power control information comprises a path loss compensation factor and a physical resource block (PRB) transmit power.

3. The apparatus of claim 1, wherein the RACH preamble is encoded for transmission without repetitions or transmission with repetitions.

4. The apparatus of claim 2, wherein the processing circuitry is configured to:

determine the transmission power of the RACH preamble transmission based on the following equation:

$$P_{NPUSCH,c}(i) = \min\begin{Bmatrix} P_{CMAX,c}(i), \\ 10\log_{10}(M_{NPUSCH,c}(i)) + P_{O\_NPUSCH,c}(j) + \alpha_c(j) \cdot PL_c \end{Bmatrix} dBm,$$

where $P_{CMAX,c}(i)$ is configured UE transmit power in NB-IoT slot i for serving cell c, $P_{O\_NPUSCH,c}(j)$ is the PRB transmit power, $M_{NPUSCH,c}(i)$ is a number of allocated PRBs, $\alpha_c(j)$ is the path loss compensation factor, and $PL_c$ is a downlink path loss estimate determined at the NB-IoT UE.

5. The apparatus of claim 1, wherein the processing circuitry is further configured to:

decode a narrowband uplink resource assignment received during the random access procedure; and encode a connection setup completion message for transmission to the base station using the narrowband uplink resource assignment.

decode configuration information received via a narrowband physical downlink control channel (NPDCCH), the configuration information including a second uplink resource assignment; and encode data for transmission on a narrowband physical uplink shared channel (NPUSCH) using the second uplink resource assignment, the data transmission having transmission power based on the power control information.

6. The apparatus of claim 5, wherein the data is encoded for transmission on the NPUSCH with repetitions.

7. The apparatus of claim 5, wherein the configuration information received via the NPDCCH further includes a number of the transmission repetitions of the data on the NPUSCH.

8. The apparatus of claim 1, wherein the processing circuitry is further configured to:

decode UE-specific radio resource control (RRC) signaling, the RRC signaling including the power control information; and encode data for transmission on a narrowband physical uplink shared channel (NPUSCH) or a narrowband physical random access channel (NPRACH), the data transmission having transmission power based on the power control information obtained via the RRC signaling.

9. The apparatus of claim 1, wherein the processing circuitry is further configured to:

encode the RACH preamble for transmission during the random access procedure and using the NPRACH resource set, wherein the NPRACH resource set is associated with a single physical resource block (PRB).

10. The apparatus of claim 9, wherein the processing circuitry is further configured to:

detect a narrowband primary synchronization signal (NPSS) in a first subframe of a received frame;

detect a narrowband secondary synchronization signal (NSSS) in a second subframe of the received frame;

determine a physical layer cell identity (PCI) of a cell of the base station based on the NPSS and the NSSS; and perform the random access procedure with the cell based on the PCI.

11. An apparatus comprising:

processing circuitry, configured to cause a base station to:

encode uplink channel configuration information within a narrowband system information block (NB-SIB), the NB-SIB including a narrowband physical random access channel (NPRACH) resource set and power control information for setting transmission power when transmitting data with repetitions using the NPRACH resource set; and decode a random access channel (RACH) preamble during a random access procedure with the UE based on the uplink channel configuration information, to grant a narrowband uplink resource assignment to the UE, wherein the RACH preamble is received with repetitions via the NPRACH resource set.

12. The apparatus of claim 11, wherein the processing circuitry is further configured to case the base station to:

encode system frame number (SFN) information within a narrowband master information block gNB-MIB) using a set of narrowband physical broadcast channel (NPBCH) symbols for transmission to a user equipment (UE) within a downlink frame wherein the NPBCH symbols occupy at least 14 symbols in a single subframe of the downlink frame, wherein the single subframe comprises 14 NPBCH symbols numbered as symbols #0 through #13; and replicate three NPBCH symbols selected from the symbols #3-#13 into symbols #0-#2 of the single subframe.

13. The apparatus of claim 11, wherein the power control information comprises a path loss compensation factor and a physical resource block (PRB) transmit power.

14. The apparatus of claim 11, wherein the processing circuitry is further configured to:

encode a narrowband primary synchronization signal (NPSS) in a first subframe of a downlink frame; and encode a narrowband secondary synchronization signal (NSSS) in a second subframe of the downlink frame.

15. A computer-readable storage medium that stores instructions for execution by one or more processors of a Narrowband Internet-of-Things (NB-IoT) user equipment (UE), wherein the instructions, when executed by the one or more processors, cause the UE to:

decode a narrowband system information block (NB-SIB) to obtain a narrowband physical random access channel (NPRACH) resource set and power control information associated with the NPRACH resource set, wherein the power control information comprises a path loss compensation factor and a physical resource block (PRB) transmit power;

encode a random access channel (RACH) preamble for transmission with repetitions to a base station during a random access procedure and using the NPRACH resource set, the transmission having transmission power based on the power control information.

16. The computer-readable storage medium of claim 15, wherein the instructions, when executed by the one or more processors, further cause the UE to:
decode a narrowband uplink resource assignment received during the random access procedure;
encode a connection setup completion message for transmission to the base station using the narrowband uplink resource assignment detect a narrowband primary synchronization signal (NPSS) in a first subframe of a received frame;
detect a narrowband secondary synchronization signal (NSSS) in a second subframe of the received frame;
determine a physical layer cell identity (PCI) of a cell of the base station based on the NPSS and the NSSS; and
perform a synchronization procedure with the cell.

17. A user equipment comprising:
a transceiver; and
processing circuitry coupled to the transceiver, wherein the processing circuitry is configured to perform operations including:
decoding a narrowband system information block (NB-SIB) to obtain a narrowband physical random access channel (NPRACH) resource set and power control information associated with the NPRACH resource set, wherein the NB-SIB includes at least two PRACH resource sets and at least two instances of associated power control information;
during a random access procedure, encoding a preamble for transmission with preamble repetition, the transmission using the NPRACH resource set and having transmission power based on the power control information;
memory coupled to the processing circuitry, the memory configured to store the NB-SIB.

18. The user equipment of claim 17, wherein the power control information includes information for compensation of path loss associated with the transmission of the preamble.

19. The user equipment of claim 17, wherein the power control information corresponds to a NPRACH coverage level.

20. The user equipment of claim 19, wherein a coverage level is associated with a number of NPRACH repetition levels.

21. The user equipment of claim 17, wherein the processing circuitry is further configured to:
encode data for transmission on a narrowband physical uplink shared channel (NPUSCH), the data transmission having transmission power based on the power control information associated with the NPRACH resource set.

22. The user equipment of claim 21, wherein the data transmission on the NPUSCH includes transmission based on a nominal power parameter, which is dependent on a coverage level of the NPRACH.

23. A processor configured to cause a user equipment (UE) to perform operations comprising:
decoding a narrowband system information block (NB-SIB) to obtain a narrowband physical random access channel (NPRACH) resource set and power control information associated with the NPRACH resource set, wherein the NB-SIB includes at least two PRACH resource sets and at least two instances of associated power control information;
during a random access procedure, encoding a preamble for transmission with preamble repetition, the transmission using the NPRACH resource set and having transmission power based on the power control information.

24. The processor of claim 23, wherein the power control information includes information for compensation of path loss associated with the transmission of the preamble.

25. The processor of claim 23, wherein the power control information corresponds to a NPRACH coverage level.

26. The processor of claim 23, wherein a coverage level is associated with a number of NPRACH repetition levels.

27. The processor of claim 23, wherein the operations further comprise:
encoding data for transmission on a narrowband physical uplink shared channel (NPUSCH), the data transmission having transmission power based on the power control information associated with the NPRACH resource set.

28. The processor of claim 27, wherein the data transmission on the NPUSCH includes transmission based on a nominal power parameter, which is dependent on a coverage level of the NPRACH.

* * * * *